United States Patent [19]

Thompson et al.

[11] Patent Number: 5,764,516

[45] Date of Patent: Jun. 9, 1998

[54] METHOD AND SYSTEM FOR SURFACE-CONSISTENT PHASE AND TIME LAG CORRECTION OF SEISMIC DATA

[75] Inventors: David D. Thompson; Bok S. Byun, both of Plano, Tex.

[73] Assignee: Atlantic Richfield Company, Los Angeles, Calif.

[21] Appl. No.: 580,819

[22] Filed: Dec. 29, 1995

[51] Int. Cl.[6] .................................................. G06F 19/00
[52] U.S. Cl. .................................................. 364/421; 367/54
[58] Field of Search .................................. 364/421, 422; 367/48, 45, 50, 54, 38, 43, 47, 49, 72, 51

[56] References Cited

U.S. PATENT DOCUMENTS

| 4,858,199 | 8/1989 | Griffith | 367/45 |
| 5,555,218 | 9/1996 | Chambers et al. | 364/421 |

OTHER PUBLICATIONS

Taner, et al., "Estimation and Correction of Near–Surface Time Anomalies", *Geophysics*, vol. 39, No. 4 (Aug. 1974), pp.441–463.

Taner, et al., "Surface consistent corrections", *Geophysics*, vol. 46, No. 1 (Jan. 1981), pp.17–22.

Cambois, et al., "Surface–consistent phase decomposition in the log/Fourier domain", *Geophysics*, vol. 58, No. 8 (Aug. 1993), pp.1099–1111.

Claerbout, *Three–Dimensional Filtering: Environmental soundings image enhancement*, (http://sepwww/sep/prof, Mar. 1995), pp. 55–59.

*Primary Examiner*—Donald E. McElheny, Jr.
*Attorney, Agent, or Firm*—Anderson, Levine & Lintel

[57] ABSTRACT

A computer system and method for correcting seismic data for phase distortion due to the effects of the near-surface layer are disclosed. Phase error corrections are performed on multiple frequency bands, beginning with a primary band and then proceeding with adjacent frequency bands. The primary band phase constant and time lag corrections are derived in a manner in which the phase correction is applied to the correlation function prior to selection of the peak time lag value, improving the accuracy of the time lag decomposition. Corrections for the secondary bands are made in such a way that the phase corrections at a tie frequency within the overlap frequencies between each secondary band and its adjacent bands are forced to be equal. At each step, surface-consistent decomposition of the phase static components and the time lag static components is performed using a weighted least-squares approach. An alternative embodiment performs the method by determining total corrections in each band to minimize the data storage requirements.

28 Claims, 10 Drawing Sheets

METHOD AND SYSTEM FOR SURFACE-CONSISTENT PHASE AND TIME LAG CORRECTION OF SEISMIC DATA

This invention is in the field of seismic prospecting for oil and gas reservoirs, and is more specifically directed to correction of seismic recording data for the effects of near-surface layers.

BACKGROUND OF THE INVENTION

The use of computer-implemented data processing techniques has become commonplace in the field of seismic prospecting for subsurface hydrocarbon deposits, particularly as the amount of data involved in modern surveys increases. For example, conventional three-dimensional ("3-D") seismic surveys require both the acquisition of a large amount of seismic signal data and an enormous amount of data processing to provide accurate and internally consistent three-dimensional survey results. Furthermore, data from previously-obtained seismic surveys are now being re-analyzed using modern signal processing and analysis techniques in order to discern the presence of oil and gas in producing quantities at locations that prior analysis was unable to detect, such as those reservoirs at greater depths than were previously discernible. This reprocessing of data has become even more important in recent years, considering that the shallower, larger, and thus easier-to-find oil and gas reservoirs have already been exploited to a large degree.

One well known problem in the field of seismic data analysis is correction of the seismic survey signal traces for near-surface effects. Near-surface effects refer to time shifts in the acoustic energy reflected from subsurface geological structures which are due to such factors as variation in the elevation of the seismic sources and receivers over the survey area, and variations in thickness and velocity of the near-surface weathered layer of the earth. Due to such effects as weathering from the elements, the near-surface layer often tends to have a lower velocity than layers deeper in the earth. The near-surface layer also often presents large velocity variations along the path of the energy which, when coupled together with variations in the thickness of the weathered layer itself, can present time delays in seismic energy that can vary widely depending upon the shot and receiver locations. If not properly accounted for in the seismic survey, these near-surface layer effects can result in poor coherence of seismic traces after normal move-out correction, thus degrading the quality of the signal in a common depth-point gather and stack.

Referring to FIG. 1, a conventional seismic survey is illustrated, in a cross-sectional view of the earth. In the simple example of FIG. 1, two source-receiver pairs $S_1$, $R_1$; $S_2$, $R_2$ have a common depth point DP at the interface of strata 4, 6, from which acoustic energy imparted by sources $S_1$, $S_2$ is reflected and detected by receivers $R_1$, $R_2$, respectively. The paths along which energy travels are referred to as paths $P_1$, $P_2$, referring to source-receiver pairs $S_1$, $R_1$; $S_2$, $R_2$, respectively. As is evident from FIG. 1, near-surface layer 2 is present near each of sources $S_1$, $S_2$ and receivers $R_1$, $R_2$, through which energy travels along paths $P_1$, $P_2$. The time lag introduced by near-surface layer 2 varies with the localized thickness of the layer, and thus may vary with offset; for example, near-surface layer 2 is much thicker near source $S_2$ than it is near source $S_1$. Even if the acoustic velocity of layer 2 is uniform throughout (which it often is not), the effect of near-surface layer 2 will be to introduce additional delay for energy along path $P_2$ relative to the energy along path $P_1$, for which correction will be required in order for the traces of energy detected at receivers $R_1$, $R_2$ to properly stack. Proper correction should also account for the variations in the absolute elevation of the sources $S_1$, $S_2$ and receivers $R_1$, $R_2$ as the variations in elevation will also be reflected in the time-domain signals corresponding to the energy detected at receivers $R_1$, $R_2$.

The correction of the seismic traces for these near-surface effects is commonly referred to in the art as solution of "statics" in the survey, considering that the near-surface effects on the traces are independent of the travel time of the reflected energy. Static corrections are conventionally directed to identifying a time delay correction factor which, when applied to a seismic trace for energy detected at a particular offset distance, corrects the trace for near-surface effects. One well-known static correction technique is referred to as "surface-consistent decomposition", or the "surface-consistent statics solution", as the correction is based on the assumption that, for a given surface location, the near-surface effects are independent of the acoustic wave path. According to this known approach, a time delay factor $\Delta_{i,j}$ is derived, after approximate normal move-out (NMO) correction, for the seismic data corresponding to a source i and detected by a receiver j in a survey, according to the following relationship:

$$\Delta_{i,j} = S_i + R_j + P_{\frac{i+j}{2}} + B_{\frac{i+j}{2}}(i-j)^2 + \ldots$$

where $S_i$ refers to the static time delay introduced in the vicinity of source $S_i$, where $R_j$ refers to the static time delay introduced in the vicinity of receiver $R_j$, where $$P_{\frac{i+j}{2}}$$

is the time delay common to all traces having the common-depth point $$\frac{i+j}{2}$$

including the path between source $S_i$ to receiver $R_j$, where the B term corresponds to an offset-dependent residual error term from NMO correction, and where (i−j) is the offset distance between source $S_i$ and receiver $R_j$.

A description of a conventional automated surface-consistent statics correction technique is provided in Taner et al., "Estimation and Correction of Near-Surface Time Anomalies", *Geophysics*, Vol. 39, No. 4 (Society of Exploration Geophysicists, 1974), pp. 441–463. As described therein, a time delay is first computed, by way of a cross-correlation technique in the time-domain, to optimally align each trace in a CDP gather. Once the $\Delta_{i,j}$ terms are measured for each trace, solution of the $S_i$ and $R_j$ statics terms in the above equation is often done using a least-squares error optimization of the above equation for the entire system of traces. Each seismic trace is then modified by a time shift value corresponding to the $S_i$ plus $R_j$ terms (and, optionally, the B $(i-j)^2$ term).

However, near surface distortions are often more complex than can be corrected by the simple time shifts provided by statics processing. Often, the seismic pulse experiences complex phase and amplitude distortions associated with the locations of the source and receiver. Correction of these distortions is sometimes attempted by surface consistent deconvolution, which conventionally determines near-surface layer distortion via analysis of the amplitude spectra of the traces, followed by the correction of the traces by minimum-phase operators. However, one cannot validly assume that the near-surface layer behaves in a minimum-phase fashion, and therefore one cannot validly assume that minimum-phase operations will be adequate for making the phase correction. In fact, significant phase distortion has been observed in many surveys, thus rendering the minimum-phase assumption invalid and rendering the minimum-phase phase correction technique of limited value.

Prior approaches have been used to account for phase distortion of the near-surface layer. These approaches directly decompose the phase spectra or first-order phase approximations (e.g., instantaneous phase of the signal) into surface-consistent phase components (i.e., linked to the source, receiver, path, and offset as in the statics equation noted above). However, the problem of phase "wrapping" (where phase shifts of greater than $2\pi$ are involved) has been encountered in these techniques, thus limiting the ability to accurately model phase behavior. In many cases, phase unwrapping is limited only to situations having less noise than normally found in pre-stack seismic data.

Conventional statics solutions can be thought of as a specialized form of phase correction. According to this perspective, a compromise fit to the actual phase spectra is produced that is based on a straight line through the origin; this type of correction is shown in the example of FIG. 2a, in which the plot $\Phi_n(f)$ corresponds to the actual distortion phase behavior of a trace as a function of frequency, and in which the line $\Phi_{sc}(f)$ illustrates the phase correction under the statics assumption. As is evident from FIG. 2, accurate phase correction is only provided by this technique at the center $f_c$ of the frequency range, where line $\Phi_{sc}(f)$ crosses plot $\Phi_n(f)$; in this example, phase distortion is under-corrected at frequencies below $f_c$ and overcorrected at frequencies above $f_c$. This approach has also been used to correct for phase behavior in multiple frequency bands but, since the correction is performed according to this conventional technique by way of a fit that passes through the origin (i.e., is a static solution) for each band, over-correction and under-correction occurs in each band in a way that also results in significant discrepancies for frequencies at or near the band boundaries. Attention is directed in this regard to FIG. 2b, in which three solutions $\Phi_{sc1}(f)$, $\Phi_{sc2}(f)$, $\Phi_{sc3}(f)$ are provided for three frequency bands, relative to actual phase error behavior plot $\Phi_a(f)$. Discontinuities in the phase behavior of this approach at tie frequencies $f_{1-2}$, $f_{2-3}$ is quite apparent in FIG. 2b.

By way of further background, the use of iterated reweighting of statistics such as the median and mode of a distribution is known for the solution of least-squares systems of equations. Attention in this regard is directed to Claerbout, "THREE-DIMENSIONAL FILTERING: Environmental soundings image enhancement" (Mar. 24, 1995), published and available on the World Wide Web at http://sepwww/sep/prof.

It is an object of the present invention to provide a method and automated system for determining and applying phase correction to seismic survey signal records to account for the phase distortion of the near-surface layer.

It is a further object of the present invention to provide such a method and system consistently over a broad frequency band.

It is a further object of the present invention to provide such a method and system in which long wavelength errors do not accumulate into the solution.

It is a further object of the present invention to provide such a method and system in which the noise-sensitivity of the near-surface correction is much reduced from conventional approaches.

It is a further object of the present invention to provide such a method and system in which phase analysis and correction may be efficiently and accurately applied, by way of multiple-frequency band analysis.

Other objects and advantages of the present invention will be apparent to those of ordinary skill in the art having reference to the following specification together with its drawings.

SUMMARY OF THE INVENTION

The invention may be implemented into a computer system and method of operating the same in which phase correction is performed over multiple frequency bands. According to the preferred embodiment of the invention, seismic traces in a gather are temporarily transformed into the frequency domain. A first frequency band is then selected, corresponding to a range of frequencies in which the signal-to-noise ratio is highest over the amplitude spectra as determined by conventional pre-stack processing. Each trace in the gather is cross-correlated with a pilot trace that has been band-pass filtered to select the first frequency band, and the envelope of the correlation function determined. The instantaneous phase at the peak of the envelope is then determined, and used in a surface-consistent decomposition to derive static source, static receiver, depth-point and offset coefficient components of the phase shift. The phase shift components are then applied to the correlation function, and the time lag at the peak of the phase-shifted correlation is determined and used in surface-consistent decomposition of the time lag into its source, receiver, depth-point and offset coefficient components of the static shift. Upon derivation of the decompositions for both time lag and phase in the first band, corrections to the broad band pre-stack data may be applied which are specifically directed to this primary frequency band. The first band processing may be iterated to produce, in each pass, a more accurate filtered pilot used in the correlation.

According to the present invention, static corrections are then derived for frequency bands adjacent to those previously corrected. In a subsequent adjacent band, the pre-stack traces are correlated with a pilot signal that includes corrections from prior frequency bands, after band-pass filtering corresponding to the desired frequency band under analysis. A rolling phase shift is applied to each correlation function to cancel the effect that any residual time shift may have on the phase function; in effect, the rolling phase shift ties the phase shift in the adjacent frequency band to the same value at a specific tie frequency as derived in a previous band. A time lag value is determined at the peak of each rolling-phase-shifted correlation function, and surface-consistent decomposition is then performed to solve for time shifts and phase shifts for this frequency band, suitable for correction of the prestack data. Iteration of the process may be performed for each of the subsequent bands, as well.

According to another aspect of the invention, each surface-consistent decomposition is performed using an iteratively weighted least-squares approach. This reduces the sensitivity of the least-squares solution to certain types of measurement errors, such as cycle skipping for the statics solution or phase wrapping for the phase solution.

According to another aspect of the invention, all surface consistent decompositions (both phase and statics) are performed using total rather than residual lag values when the process is iterated. As a result, residual error, such as that due to long-wavelength effects in seismic data, does not accumulate from iteration to iteration.

According to another aspect of the invention, an efficient approach for performing the method is provided, in which the number of copies of corrected prestack data stored in the computer is minimized.

DETAILED DESCRIPTION OF THE PREFERRED EMBODIMENTS

Figure 3:
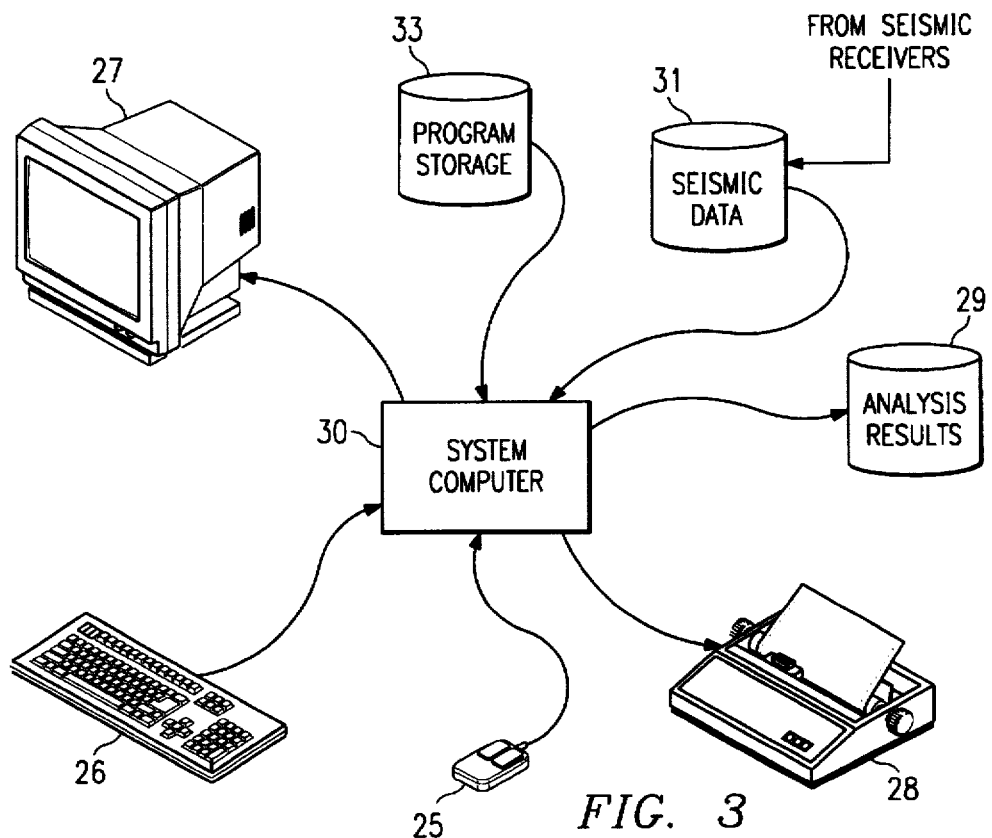
FIG. 3 is a computer system programmed to perform the method according to the preferred embodiments of the invention.

Referring now to FIG. 3, a computer system into which the preferred embodiments of the invention may be implemented will be described. This system includes system computer 30, which may be implemented as any conventional personal computer or workstation, such as a UNIX-based workstation such as a SPARCstation available from Sun Microsystems, Inc., implemented either in standalone fashion, or as part of a network arrangement System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may, of course, be used to store any and all of the program instructions, measurement data, and results as desired.

In the preferred embodiments of the invention, seismic data from the seismic receivers are stored on disk storage device 31, from which system computer 30 may retrieve the appropriate data to perform the analysis described hereinbelow, according to program instructions that correspond to the method described hereinbelow. For operation on system computer 30, the program instructions are written in the form of a computer program (e.g., in C++ or in any other suitable language) stored in computer-readable memory, such as program disk storage device 33 of FIG. 3; of course, the memory medium storing the computer program may be of any conventional type used for the storage of computer programs, including hard disk drives, floppy disks, CD-ROM disks, magnetic tape, and the like.

System computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 may either be located at a data center remote from the survey region, or alternatively may be located on site at the seismic survey to provide real-time analysis of the seismic survey as it is being taken.

Disk storage 31 is in communication with seismic receivers (generally via a recording unit and associated computer, not shown), to receive signals indicative of the reflected seismic energy received thereat in the survey. Of course, the system of FIG. 3 and the methods described herein may be applied either to land-based seismic surveys or to marine seismic surveys. These signals from the seismic receivers, after conventional formatting and other initial processing, are stored as digital data in disk storage 31 for subsequent retrieval and processing in the manner described hereinbelow. FIG. 3 illustrates disk storage 31 as connected to system computer 30; such connection may either be a direct connection, by way of a local area network, or by remote access. As such, system computer 30 is able to retrieve seismic signal data from disk storage 31 as desired, for processing according to the methods described hereinbelow and in other conventional ways. While disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 4:
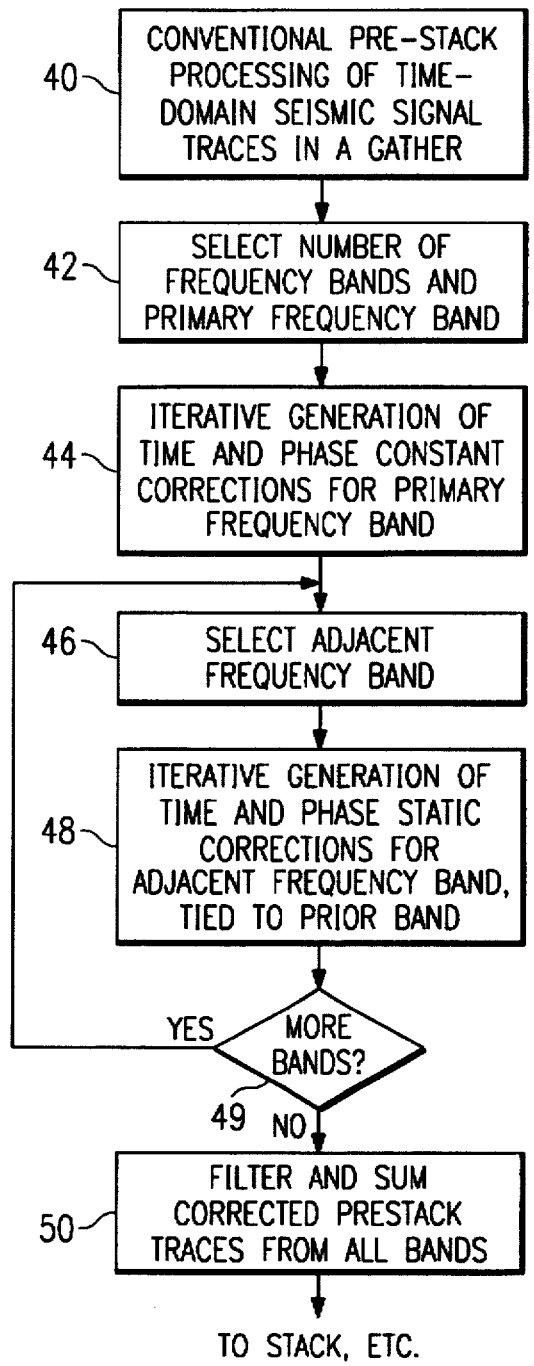
FIG. 4 is a flow chart illustrating the method according to a first embodiment of the present invention.

Referring now to FIG. 4, the operation of a first embodiment of the present invention will now be described. An alternative and preferred embodiment of the invention will also be described in further detail hereinbelow relative to FIGS. 9 through 12. As shown in FIG. 4, the method according to the first embodiment of invention begins with process 40, in which system computer 30 retrieves the seismic data from disk storage 31 corresponding to a group of traces, such a group of traces conventionally referred to as a "gather", and performs conventional pre-stack processing of the signals in the conventional manner. The gather of traces processed in process 40 will generally be selected according to a common feature; typically, the gather processed in process 40 will be a group of traces having common depth-point reflections, in which case the gather is referred to as a common depth-point (CDP) gather. The pre-stack processing of process 40 may include such steps as normal move-out correction (NMO), conventional solution of statics for time delay, and the application of a series of band pass filters for analysis of the quality of the seismic data under analysis. Typically, conventional pre-stack application of band-pass filters to the pre-stack data is performed in order to define the highest usable signal frequency; as will now be apparent, the application of band pass filters in process 40 will also serve to define the methodology for the phase-statics solution according to the present invention.

In this regard, process 40 is followed by process 42 in which a set of frequency bands are selected for use in the method according to the present invention, such selection including both the number of frequency bands and also the frequencies within each. The number and bandwidth of the frequency bands determined in process 42 generally depends upon the behavior of the signals in the survey; for example, rapid changes in phase over the survey may require several bands, while well-behaved and minimal phase distortion will require fewer frequency bands. For typical seismic data, it is unlikely that more than five to ten bands will be practical, due to the increasing effects of noise for narrow frequency bands. It is contemplated that typical widths of the frequency bands defined in process 42 will be on the order of tens of Hertz. In addition to definition of the frequency bands, process 42 is performed to select a primary frequency band, which will be typically the frequency band having the most coherent signals (i.e., the highest signal-to-noise ratio). Process 42 is typically performed by a human analyst operating system computer 30, viewing the results of pre-stack process 40 by way of graphics display 27.

Following the determination of the primary frequency band in process 42, the method according to the first embodiment of the invention continues with process 44 to generate time lag and phase corrections for the traces in the gather, where the corrections are based upon the analysis of the signals in the primary frequency band selected in process 42. Specifically, the phase corrections will be based, for each frequency band, upon the phase as a function of frequency. For purposes of this description, the term "phase function" will refer to the straight line segment defined for each frequency band, each phase function having a projected intercept at zero frequency (referred to herein as the "phase constant"), and having a slope (referred to herein as the "phase slope") that is dependent upon the statics (or time delay). Looking ahead to FIG. 8, phase functions $\Phi_{c1}(f)$, $\Phi_{c2}(f)$, $\Phi_{c3}(f)$ are plotted as a function of frequency over three bands $B_1$, $B_2$, $B_3$, respectively, with respective projected zero-frequency intercepts (i.e., phase constants) P1, P2, P3.

Figure 5:
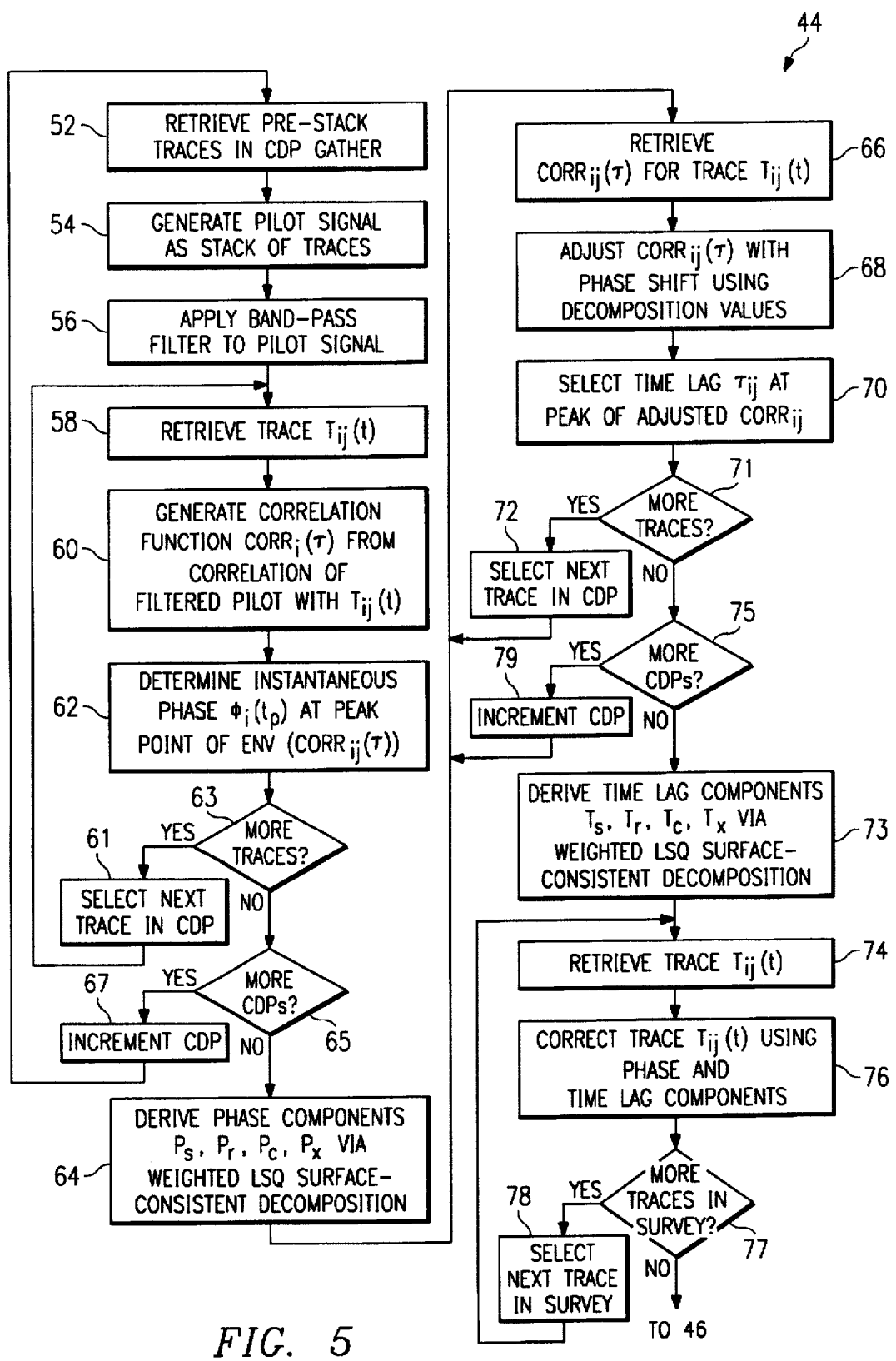
FIG. 5 is a flow chart illustrating primary frequency band analysis in the method according to the first embodiment of the invention.

Referring now to FIG. 5, process 44 will be described in more detail. Primary band correction process 44 begins with process 52, in which data corresponding to the prestack traces in the CDP gather are retrieved by system computer 30 from disk storage 31. Each of the retrieved traces consists of a time-domain function of detected signal amplitude over time, expressed in digital form as a sequence of sample values as is well known in the art, and includes such prestack processing noted above including NMO correction. After retrieval of the prestack traces in the CDP gather, the traces are added to one another in process 54, in the same manner as a conventional stack, to produce a pilot signal S(t) for the gather. System computer 30 then applies a band-pass filter to pilot signal S(t), where the pass band of the filter corresponds to the primary frequency band selected in process 42; the filter is, of course, typically applied as a digital filter. The filtered pilot signal $S_p(t)$ is then ready for use in the remainder of process 44.

System computer 30 then retrieves, from disk storage 31 or from its own memory, as the case may be, a first trace $T_{ij}(t)$, in process 58. Trace $T_{ij}(t)$ corresponds to the signal trace indicating the acoustic energy imparted to the earth by a source i and received by a receiver j. System computer 30 then generates a correlation function $corr_{ij}(\tau)$ from the cross-correlation of trace $T_{ij}(t)$ with band-pass filtered pilot signal $S_p(t)$, in process 60. The cross-correlation of process 60 is performed in the conventional manner, according to the well-known cross-correlation function:

$$corr_{ij}(\tau) = \frac{\Sigma T_{ij}(t) S_p(t+\tau)}{\sqrt{\Sigma T_{ij}^2(t) \Sigma S_p^2(t)}}$$

where $\tau$ is the time shift between the pilot signal $S_p(t)$ and trace $T_{ij}(t)$, with each of the sums computed over a range of time values t corresponding to a desired analysis gate. Following the generation of correlation function $corr_{ij}(\tau)$, system computer 30 then performs process 62 to determine the instantaneous phase $P_{ij}(\tau_p)$ at the peak delay time $\tau_p$ in the envelope of correlation function $corr_{ij}(\tau)$. Process 62 is performed by first generating the envelope function env($corr_{ij}(\tau)$). As is well known in the art, the envelope function corresponds to the following definition:

$$env(corr_{ij}(\tau)) = \sqrt{[corr_{ij}(\tau)]^2 + [H(corr_{ij}(\tau))]^2}$$

where $H(corr_{ij}(\tau))$ is the Hilbert transform of the correlation function $corr_{ij}(\tau)$. The generation of the envelope function is conventional in the field of seismic data processing. According to this embodiment of the invention, however, process 62 identifies the time lag value $\tau_p$ at which the envelope function is at a maximum, and identifies the principal instantaneous phase of trace $T_{ij}(t)$ relative to the band-pass filtered pilot signal $S_p(t)$ at the envelope peak time delay value $\tau_p$. Identification of the principal instantaneous phase value $P_{ij}(\tau_p)$, ranging from $-180°$ to $+180°$, may be determined in the conventional way, by the relation:

$$P_{ij}(\tau_p) = \tan^{-1}\left[\frac{H(corr_{ij}(\tau_p))}{corr_{ij}(\tau_p)}\right]$$

Decision 63 is then performed to determine if instantaneous phase values $P(\tau_p)$ are yet to be determined for any other traces in the CDP gather. If so, process 61 selects the next trace in the CDP gather (i.e., the next combination of source i and receiver j having a common depth point with the previous trace), and processes 58, 60, 62 are performed for the next trace in the gather until all traces have had their instantaneous phase values $P(\tau_p)$ so determined (i.e., until decision 63 returns a NO). Decision 65 then determines if additional CDP gathers in the survey remain to be processed to determine the instantaneous phase values $P(\tau_p)$ for their traces; if so, system computer 30 increments to the next CDP gather (process 67), and processes 52 through 62 are repeated.

Once all of the instantaneous phase values $P(\tau_p)$ have been determined for all of the traces in all of the gathers (decision 65 returns a NO), system computer 30 next performs a surface-consistent decomposition operation, in process 64, to solve for the phase constants (i.e., the intercept of the phase function) due to the near-surface layer of the earth near the sources and receivers represented in the survey. As is well known in the art, surface-consistent decomposition is the solution of a set of equations, one for each trace $T_{ij}(t)$, to derive a solution for the various components of a particular time lag or phase shift The form of equation for the surface-consistent time lag decomposition is described hereinabove in the Background of the Invention. For the decomposition of the components of the phase constants, as performed in process 64, the form of equation for trace $T_{ij}(t)$ is as follows:

$$P_{i,j} = P_{si} + P_{rj} + P_c + P_x(i-j)^2$$

where $P_{si}$ refers to the phase shift introduced in the vicinity of source i, where $P_{rj}$ refers to the phase shift introduced in the vicinity of receiver j, where $P_c$ is a phase shift for the common-depth point gather including the path between source i to receiver j (but excluding near-surface and offset-dependent effects, but including distortions in the pilot itself), and where the $P_x$ term is an offset-dependent phase coefficient applied to the square of the offset distance between source i and receiver j (i.e., the term $(i-j)^2$).

The surface-consistent decomposition of process 64 is typically performed according to a least-squares minimization of the system of equations of the instantaneous phase shifts $P_{ij}(\tau_p)$ and may thus be done according to conventional optimization techniques to solve for each of the $P_{si}$ and $P_{rj}$ terms. According to this embodiment of the invention, however, it is preferable to perform process 64 by way of an iteratively weighted least-squares optimization. The iterative weighting of the optimization provides a result of improved accuracy, as certain spurious phase errors, such as those due to inconsistent phase wrapping, are discounted for use in the least squares minimization so long as the errors are not too numerous.

This embodiment of the invention thus performs process 64 using the technique described in Section 3.3.4 of the Claerbout article referred to hereinabove, in which one may use a sequence of iteratively weighted means according to a certain weighting function dependent upon the statistic being estimated, to derive these weighted statistics. As described therein, the weighted mean m of a sequence of N data values d may be determined as follows:

$$m = \frac{\sum_{i=1}^{N} w_i^2 d_i}{\sum_{i=1}^{N} w_i^2}$$

where $w_i^2$ is the squared weighting function. One may estimate a sequence of mode weighting factors $w_i^{(mode)}$, to convert the above equation toward a calculation of a weighted mode, as follows:

$$w_i^{(mode)} = \frac{1}{1 + |r_i/\bar{r}|}$$

where $r_i$ is the residual difference between the ith data value and a weighted mean, and where $\bar{r}$ is an average residual magnitude, such as the median of the absolute value of $r_i$ over the sample. Indeed, the value of $\bar{r}$ may be arbitrary, as large values (above the 50$^{th}$ percentile) will draw the weighted mode toward the arithmetic mean.

In this embodiment of the invention, a sequence of weighted optimizations are solved based on this approach, each optimization minimizing a sum Q defined as:

$$Q = \sum_{i=1}^{N} (w_i r_i)^2$$

where the $w_i$ is the weight applied to the ith one of N traces in the survey when the least-squares optimization is performed, and where $r_i$ is the residual for the ith trace (i.e., the difference between the surface-consistent measurement of the phase or time-lag and the actual measurement). Preferably, the weighting factors w are set, for the first iteration, either to unity or to a value proportional to the peak normalized correlation value for the trace. Subsequent iterations of the surface-consistent decomposition process will then adjust the weighting factor $w_i$ for the ith trace in the $(j+1)^{th}$ iteration, based on the residual $(r_i)_j$ obtained in the previous $(j^{th})$ iteration, as follows:

$$(w_i^2)_{j+1} = \frac{K^2}{(r_i^2)_j + K^2}$$

K is a small positive transition error constant, which adjusts the rate at which the weighting factor changes. Accordingly, for a small residual error $r_i$, the weighting factor $w_i$ will eventually approach unity, while large residual errors $r_i$ will drive toward a small weighting factor. It has been observed that the use of this iterative weighted least-squares approach approximately minimizes the sum of the logarithms of those residual errors $r_i$ that are significantly larger than the sum of K plus the sum of the squares of the residuals less than K. Because of this characteristic, the impact of large errors in a few traces introduced by effects such as cycle-skipping (in time-lag static correction) and phase wrap-around (in phase correction) is greatly reduced, while preserving the desirable properties of the least-squared optimization for traces that are not subject to such errors.

It is contemplated that the iteratively weighted least-squares surface-consistent decomposition will provide benefit even in conventional statics solutions. In these conventional approaches, the least-squares surface-consistent decomposition will be performed iteratively, for example upon the system of time delay equations for each trace, with weighting factors for each of the traces in the minimization of a weighted sum as described hereinabove.

As a result of process 64, values of the phase constant PS for each of the sources, the phase constant $P_r$ for each of the receivers, the CDP-dependent term $P_c$ and the offset-dependent phase coefficient $P_x$ are determined. According to this embodiment of the invention, these values will be used both in phase-correcting the prestack traces, in the manner to be described in further detail hereinbelow, and are also applied to the correlation function in determining the static time lag corrections, as will now be described.

System computer 30 next performs process 66, in which a first correlation function $corr_{ij}(\tau)$, corresponding to a trace $T_{ij}(t)$ in the gather, is retrieved from memory (or disk storage 31). System computer 68 adjusts the retrieved correlation function $corr_{ij}(\tau)$ by introducing a phase shift function $P_{ij}(\tau)$ thereinto which is calculated from the sum of the component results of decomposition process 64 (i.e., the sum $P_{si}+P_{rj}+P_c+P_x(i-j)^2$, for the source i and receiver j corresponding to correlation function $corr_{ij}(\tau)$). The resultant phase-shifted correlation function $\hat{C}(\tau)$ thus includes phase correction as determined by the surface-consistent decomposition of the phase components. Following the phase shift adjustment of process 68, system computer 70 determines the time lag $\tau_{ij\phi}$ at the peak of the phase-shifted correlation function $\hat{C}(\tau)$.

By operation of decision 71 and process 72, followed by decision 75 and process 79, the retrieval, phase-shift adjustment and time lag selection processes 66, 68, 70 are performed for each of the traces $T_{ij}(t)$ in each of the gathers in the survey, through a similar iteration process as used in the determination of the principal instantaneous phase values for the traces. Upon determination of the time lag $T_{ij\phi}$ for all of the traces in the last gather (i.e., decision 75 returns a NO result), solution of the time lag statics is then performed in process 73.

According to this embodiment of the invention, process 73 solves the system of surface-consistent time lag equations, one for each trace $T_{ij}(t)$ in the survey, to derive the various statics solution for the components $$T_{ij\phi}=T_{si}+T_{rj}+T_c+T_x(i-j)^2$$

where $T_{si}$ refers to the static time lag introduced in the vicinity of source i, where $T_{rj}$ refers to the static time lag introduced in the vicinity of receiver j, where $T_c$ is a time delay for the common-depth point gather including the path between source i to receiver j and the static shift of the pilot used in the correlation of process 60, where the $T_x$ is an offset-dependent time lag coefficient and where (i–j) is the offset distance between source i and receiver j. As in the case of phase decomposition process 64, time lag surface-consistent decomposition process 73 is preferably performed using the iteratively weighted least-squares optimization, so as to reduce the adverse impact of occasional cycle skipping.

According to this embodiment of the invention, therefore, the phase-shift decomposition is effectively decoupled from the time lag decomposition. In the ideal case (i.e., where no noise is present in the survey), the time lag value $\tau_p$ at the peak of the envelope of the correlation would correspond identically to the peak of the correlation function itself after incorporation of the phase adjustment of process 68; in other words, selection and decomposition of the time delay value $T_{ij\phi}$ at the peak of the phase-shifted correlation function $\hat{C}(\tau)$ would be performed at the same time lag $\tau_p$ used in the phase decomposition. However, since seismic survey data by nature include significant noise, such an assumption would not be valid. Accordingly, the present invention provides improved accuracy in correcting both time lag and phase-shift statics, as the time lag value $T_{ij\phi}$ used in the time lag surface decomposition is the peak of a phase-shifted correlation function $\hat{C}(\tau)$ peak after the application of a phase shift that is derived by way of a surface-consistent model. As a result, the selection of the peak time lag $T_{ij\phi}$ used in the time lag surface-consistent decomposition is a more accurate selection, particularly in noisy situations and situations in which phase distortion is present, than would be the selection if the phase shift were not applied thereto.

Following derivation of the time lag surface consistent components, process 74 is performed to retrieve a pre-stack trace $T_{ij}(t)$ from memory or disk storage 31. Process 76 is then performed to apply both time lag and phase-shift corrections. The time lag correction applied in process 76 is the sum of the surface-consistent decomposition results $T_{si}$ and $T_{rj}$ (and optionally $T_x(i-j)^2$) as determined by process 73, and the phase correction applied in process 76 is the sum of the surface consistent decomposition results $P_{si}$ and $P_{rj}$ (and optionally $P_x(i-j)^2$) as determined by process 64. In process 76, system computer 30 then applies the particular values of the phase and static components to the prestack traces, incorporating into these prestack traces the corrections resulting from process 44. Decision 77 and process 78 then repeat processes 73, 74, 76 for each of the traces in the survey, as before.

It should be noted that the corrections applied to prestack traces $T_{ij}(t)$ in process 76 are derived from a primary frequency band (i.e., the pass-band of the band-pass filter applied in process 56), but are applied to each trace in a broad-band manner, in order to prepare the data for processing the next adjacent frequency band.

Upon correction of all of the traces $T_{ij}(t)$ in the survey, as performed in the repetition of process 76 (i.e., when decision 77 returns a NO result), a first pass correction for the selected primary frequency band is complete. Process 44 may be iteratively performed, according to this embodiment of the invention, in which case the pilot signal S(t) is updated to be the stack of the prestack traces, after the correction of process 76 has been applied to each of the traces from the prior iteration. The correlation performed in each successive iteration of process 60 is made between the pilot signal of corrected traces and the corrected prestack traces themselves. In this case, the phase constants and statics computed in each iteration are residuals, and not the entire set of corrections. The repeated performance of process 44 will provide increasingly more accurate corrections through each pass, by resulting improvements in the quality of pilot traces, thus reducing the likelihood of cycle skipping. The iterations may be terminated upon performing a pre-specified number of passes, or may be terminated upon the corrections being below a selected threshold value. Upon termination of process 44, corrected prestack traces $T_{ij}(t)$ are stored in disk storage 29.

Referring back to FIG. 4, upon completion of process 44, the next frequency band for analysis is selected in process 46. As will become apparent from the following description, the next frequency band selected in process 46 is adjacent in frequency to a previously processed frequency band. Where process 46 is performed for the first time, the frequency band selected in process 46 is one which is adjacent to the primary frequency band used in process 46, either immediately higher or lower in frequency. System computer 30 then performs process 48, in which time and phase static corrections are iteratively generated for this next, secondary, frequency band.

Figure 6:
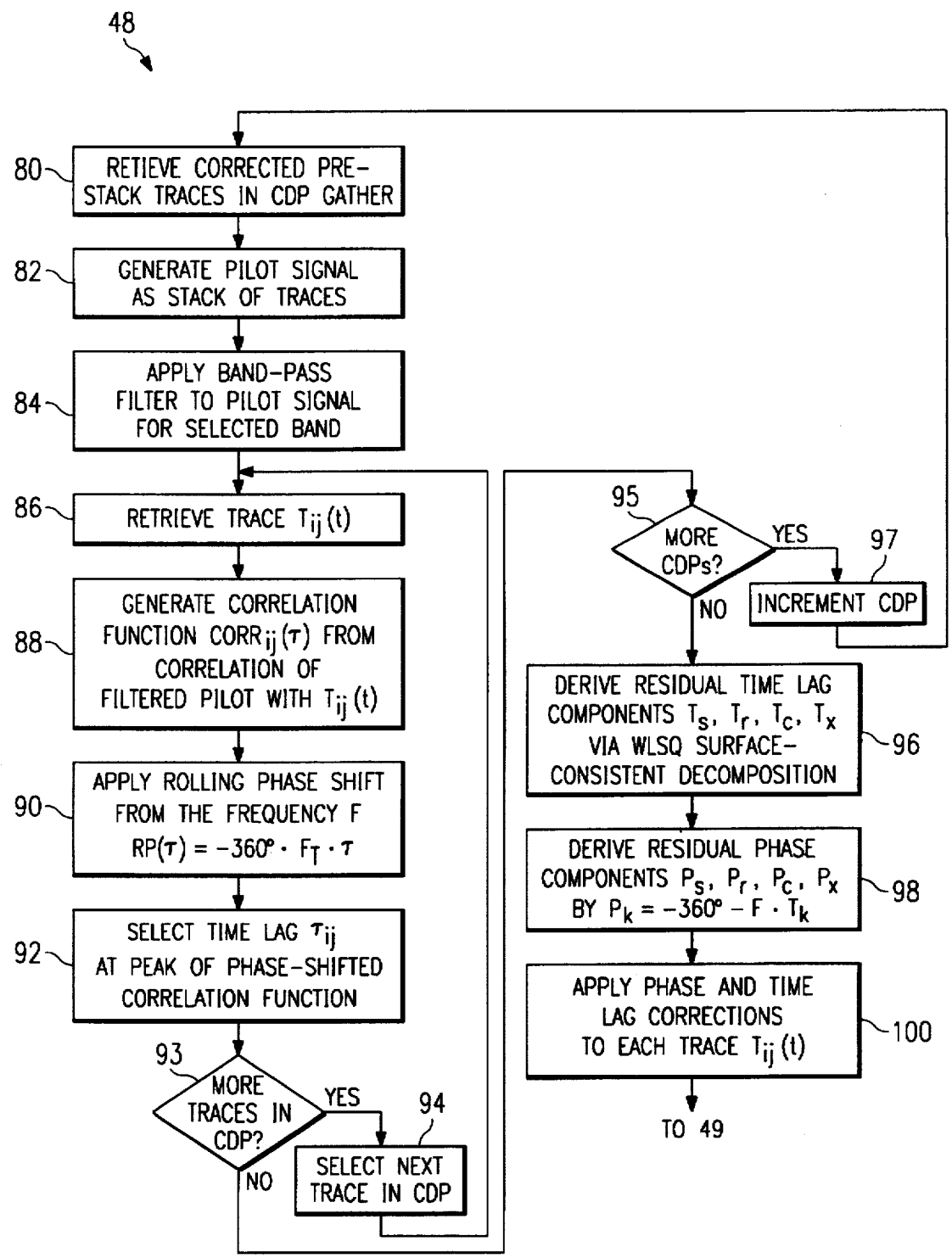
FIG. 6 is a flow chart illustrating secondary frequency band analysis in the method according to the first embodiment of the invention.

Referring now to FIG. 6, the iterative generation of time shift and phase constant corrections performed by system computer 30 in process 48 for secondary frequency bands will now be described in detail. Process 48 begins in similar fashion as process 44 described hereinabove, with the retrieval by system computer 30 from its memory of prestack traces $T_{ij}(t)$ in the gather under consideration, in process 80; the traces $T_{ij}(t)$ retrieved in process 80 are traces that are corrected based upon a previously processed adjacent band (i.e., the primary frequency band or another secondary band already corrected). Process 82 is then performed as before to generate a pilot signal S(t) as the sum of the retrieved prestack traces $T_{ij}(t)$ in the gather. A band-pass filter is then applied by system computer 30 to the pilot signal S(t) in process 84, with the pass-band of the filter corresponding to the frequency band selected in process 46, to produce a secondary filtered pilot signal $S_s(t)$.

The band-pass filter applied in process 84 must, as noted above, correspond to the selected frequency band under analysis in the current iteration of process 48. According to this embodiment of the invention, it is important that this selected frequency band overlap a portion of the previously analyzed adjacent frequency band. This overlap will allow the phase corrections among bands to tie to one another, as will be described hereinbelow. In addition, the roll-off of the band-pass filter at its frequency extremes should match the roll-off of the filter for the adjacent band so that the sum of the filters corresponding to each frequency band will have a substantially flat amplitude spectrum and zero phase across the entire frequency range defined by the union of the bands.

In process 86, system computer 30 retrieves a trace from memory, either its own main memory or from disk storage 31. This trace is corrected to the extent that primary band processing (process 44) and previous adjacent frequency bands (process 48) have been previously applied thereto. In process 88, system computer 30 generates a correlation function $corr_{ij}(\tau)$, which is the cross-correlation of the filtered pilot signal $S_s(t)$ with the retrieved trace $T_{ij}(t)$.

Figure 7A:
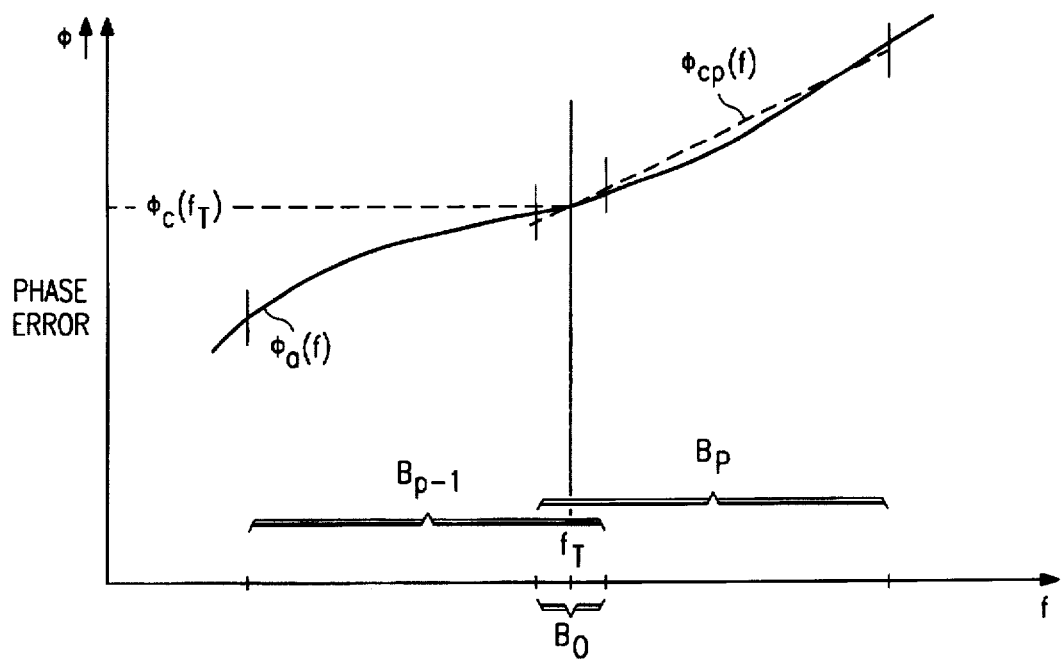
FIGS. 7a and 7b are phase error versus frequency plots illustrating the operation of the analysis of FIG. 6.

According to this embodiment of the invention, in process 48 which operates upon frequency characteristics in secondary frequency bands (i.e., those other than the primary frequency band processed in process 44), a rolling phase shift function is derived in process 90 and applied, preferably via the Hilbert transform, to the correlation function $corr_{ij}(\tau)$. This rolling phase shift operates as a function of the correlation time lag value $\tau$, and is computed so that, no matter which time lag value $\tau$ is selected as being optimal, the correlation has been shifted at that time lag value so as to cancel the change in the phase function at the tie frequency between the current band and the adjacent band that is produced by a time shift equal to that time lag value. Attention is directed to FIG. 7, in which the phase error versus frequency plot $\Phi_d(f)$ is illustrated at the overlap frequencies between the primary frequency band $B_p$ and, for example, its lower adjacent secondary frequency band $B_{p-1}$. As shown in FIG. 7a, an overlap band $B_o$ exists which is within both primary frequency band $B_p$ and $B_{p-1}$; the center frequency $f_r$ of this overlap band $B_o$ will be referred to herein as the "tie" frequency, at which the phase error correction from primary frequency band $B_p$ and that from secondary adjacent frequency band $B_{p-1}$ will be forced equal to one another.

In process 90, therefore, a rolling phase shift RP is applied to the correlation as follows:

$$RP(\tau) = -360° \cdot f_T \tau$$

Figure 7B:
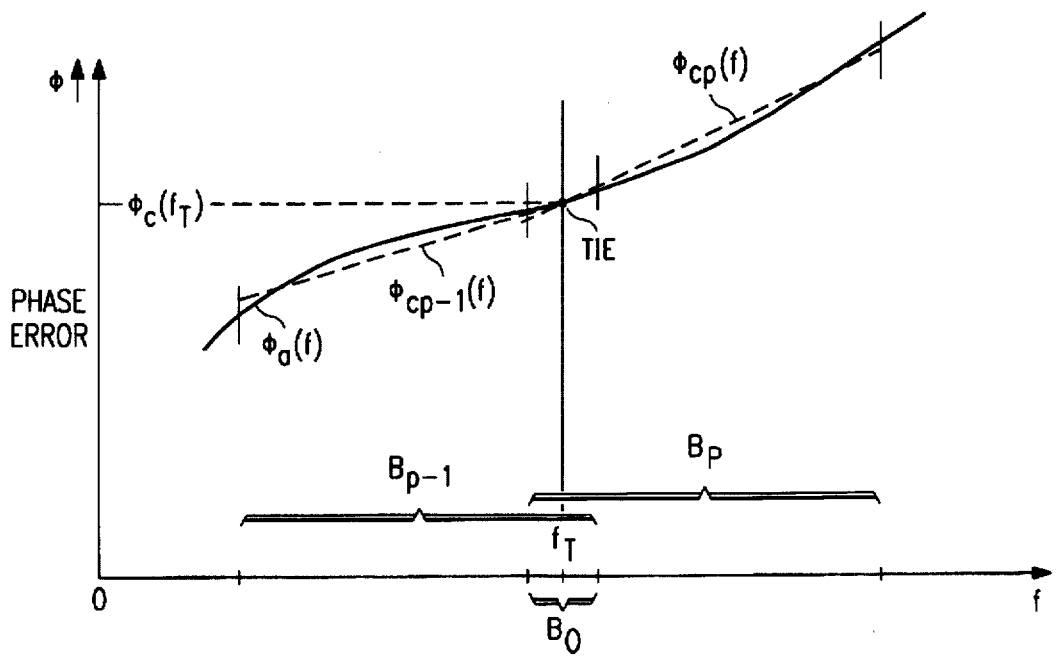

This rolling phase shift RP will force the residual phase correction that will be derived in process 48 (i.e., the additional phase constant and static corrections to those previously derived for the previously processed adjacent band) for each lag time $\tau$ to cancel to zero at the tie frequency $f_T$. The tying of the residual phase correction for secondary adjacent frequency band $B_{p-1}$ relative to primary frequency band $B_p$ effectively reduces the number of degrees of freedom to one, for each trace on each secondary band, since the change in phase constant between the two adjacent frequency bands is proportional to the change in time shift between the two bands. Referring to FIG. 7b, the combination of the phase constant and static correction (i.e., the phase-static correction) for adjacent frequency band $B_{p-1}$ is illustrated as dashed line segment while the phase static correction for primary frequency band $B_p$ is illustrated as dashed line segment $\Phi_{cp}(f)$. As shown in FIG. 7b, the value of $\Phi_{cp-1}(f_T)$, at tie frequency $f_T$, is forced to the value $\Phi_{cp}(f_T)$, at point TIE.

Referring back to FIG. 6, after application of the rolling phase shift function $RF(\tau)$, the phase-shifted correlation function $corr_{ij}(\tau)$ is analyzed to determine the time lag value $\tau_p$ at which the function has its peak. This time lag value $\tau_p$ is then stored in the memory of system computer 30 in association with trace $T_{ij}(t)$. Decision 93 determines if additional traces in the gather are to be similarly analyzed; if so, the indices i, j are set to those corresponding to the next trace in process 94, and processes 86, 88, 90, 92 repeated to determine the time lag value $\tau$ at which the corresponding correlation functions reach their peak for all traces in the gather. Decision 95 and incrementing process 97 are performed upon the completion of each CDP gather, so that processes 86, 88, 90, 92 are performed for each trace in each CDP gather of the entire survey.

Once the set of peak time lag values $\tau_p$ are determined for all of the traces $T_{ij}(t)$ in the survey, system computer 30 performs process 96, in which the residual time lag components $T_{si}$, $T_{rj}$, $T_c$ and $T_x(i-j)^2$ are determined using a weighted least-squares surface-consistent decomposition, as described hereinabove relative to processes 64 and 73. These components are, as before, specific components for each source i, receiver j, and offset (i−j) in the traces $T_{ij}(t)$ in the gather, and are residual components in the sense that these components are corrections in addition to those previously determined for the gather based upon the adjacent frequency band previously analyzed.

Once the residual time lag components are determined in process 96 for this secondary frequency band, system computer 30 determines residual phase constant components $P_{si}$, $P_{rj}$, $P_c$, $P_x(i-j)^2$ merely by the application of an equation similar to that used to generate the rolling phase shift function:

$$P_k = -360° \cdot f_T \cdot T_k$$

where $P_k$ is one of the phase constant components, where $T_k$ is the corresponding time lag static component, and where $f_r$ is the tie frequency.

Once the residual phase constant and time-lag static correction components are determined, system computer 30 applies these correction components (which actually represent the changes in statics and phase constants to those previously applied based on analysis of the adjacent band) to the previously corrected prestack traces $T_{ij}(t)$. Again, while the band-pass filtering of the pilot signal serves to limit the contribution of the residual corrections to the particular selected secondary frequency band, the results of the residual corrections are applied to the traces in a broad-band manner. If desired, process 48 may be repeated, using the newly corrected traces as the prestack traces retrieved in process 80. The phase tying procedure will continue to operate correctly in multiple iterations of process 48, since the incoming data produced by the previous iteration will not have been altered at the tie frequency $f_T$. Upon the completion of either a predetermined number of passes, or upon the residual correction magnitudes falling below a threshold value, processing for this selected frequency band is then complete. As for the primary frequency band, a copy of the broad band prestack traces bearing the phase-static corrections determined for this secondary frequency band will be saved in disk storage 29.

Referring back to FIG. 4, upon completion of process 48, system computer 30 determines if additional bands must be processed, by decision 49. If so, processes 46 and 48 are repeated for these additional frequency bands. Of course, the frequency band selected each time by process 46 is to be adjacent to a frequency band previously corrected, so that tying of the phase correction at the tie frequency within the overlap band may be performed. In this regard, it is contemplated that the primary frequency band analyzed in process 44 is typically not at one of the extremes of the overall frequency range, such that it will have adjacent frequency bands that are both higher and lower than the primary band. The method of this embodiment of the invention will thus preferably be performed by first proceeding in one direction (i.e., progressively higher or progressively lower) from the primary frequency band, and then proceeding in the other direction from the primary band. The initial input for each new band must be the output saved from a previously processed adjacent frequency band. This approach will ensure proper tying of the phase corrections at the overlap frequencies.

Upon completion of all bands, as indicated by a NO from decision 49, process 50 is then performed to combine the results from all the frequency bands, by retrieving the broad-band corrected traces from the processing of each frequency band, and applying thereto a band-pass filter corresponding to that frequency band, to derive the trace behavior for that frequency band. This retrieval and filtering is performed for each trace for each frequency band, and the results are summed across the frequency bands, traceby-trace, to derive output traces that incorporate the corrections for all frequency bands. Preferably, the bandpass filters are designed to overlap with one another in a relatively smooth fashion as indicated above and, since the phase corrections are tied at the tie frequency within the overlap band, the summing of corrections from the various bands in process 50 provides survey traces with broad-band phase-correction applied thereto.

Figure 1:
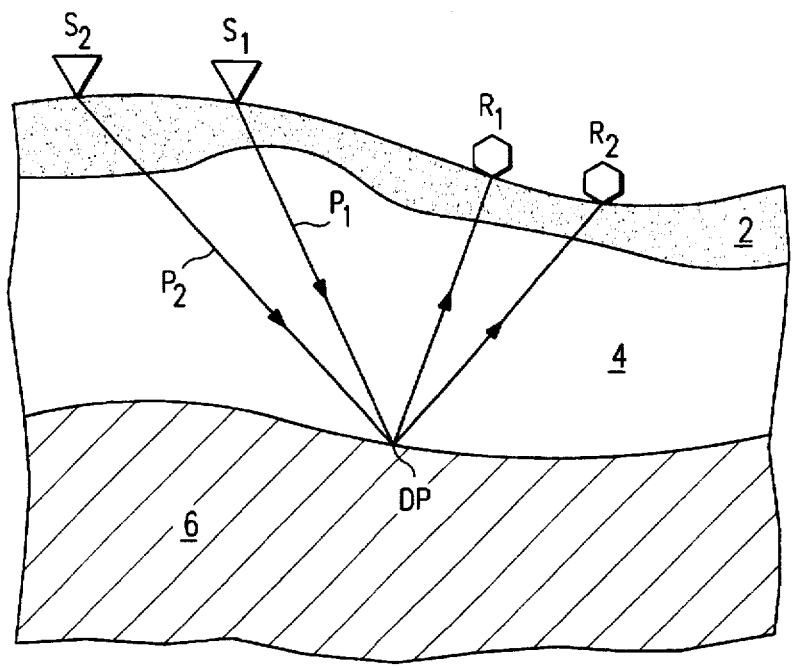
FIG. 1 is a cross-sectional view of a portion of the earth at which a typical land-based seismic survey is performed.
Figure 2A:
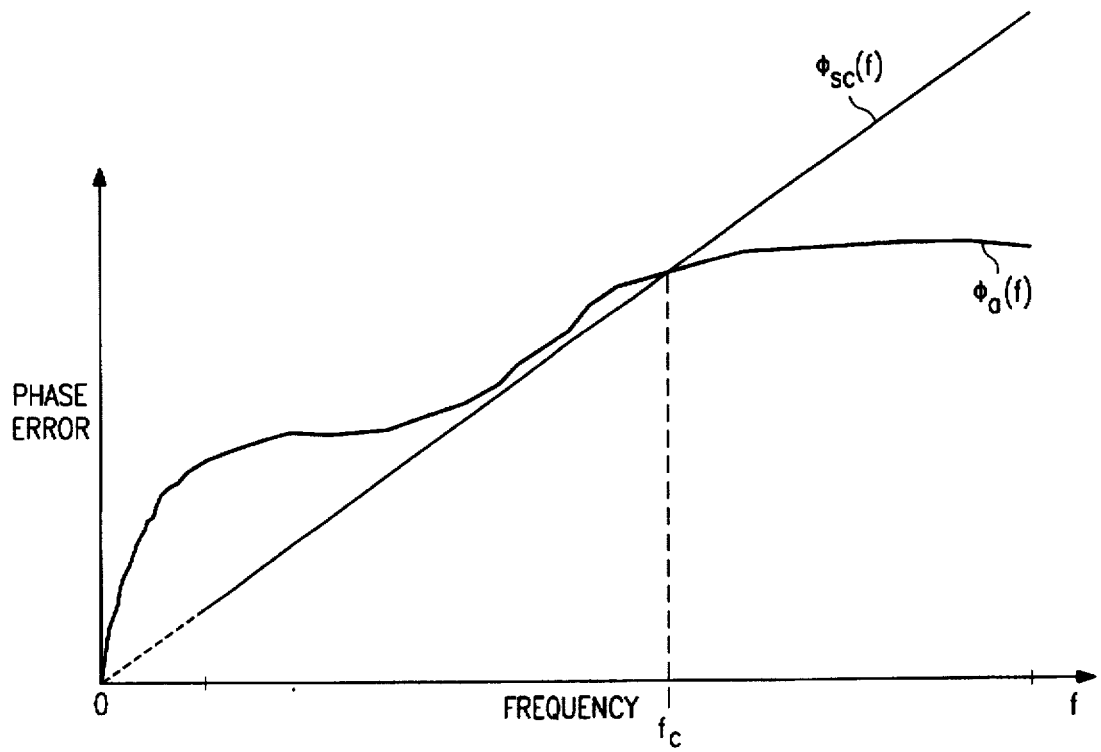
FIGS. 2a and 2b are plots of phase error versus frequency, illustrating over-correction and under-correction resulting from conventional methods.
Figure 2B:
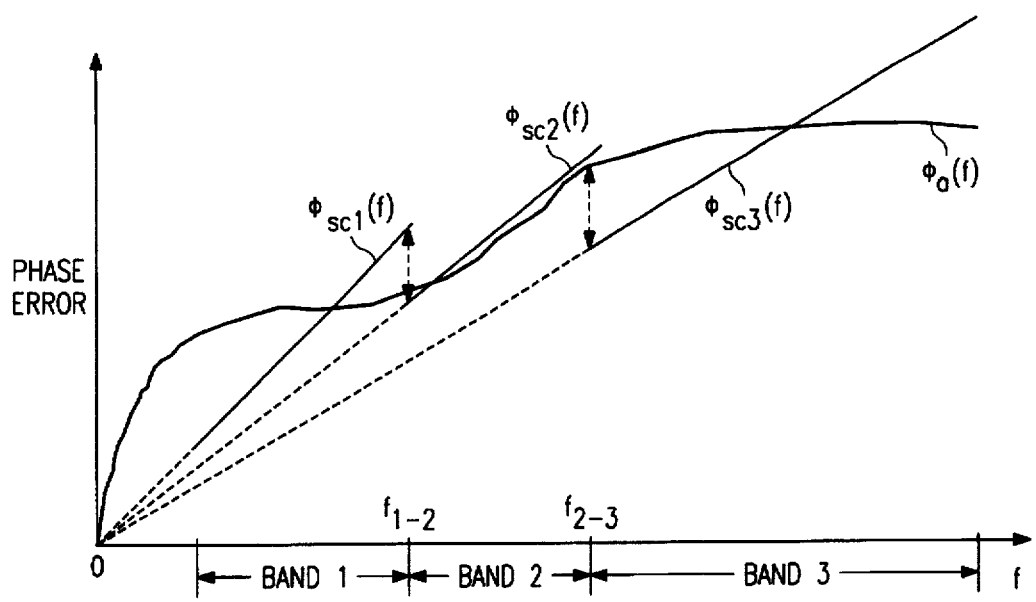
Figure 8:
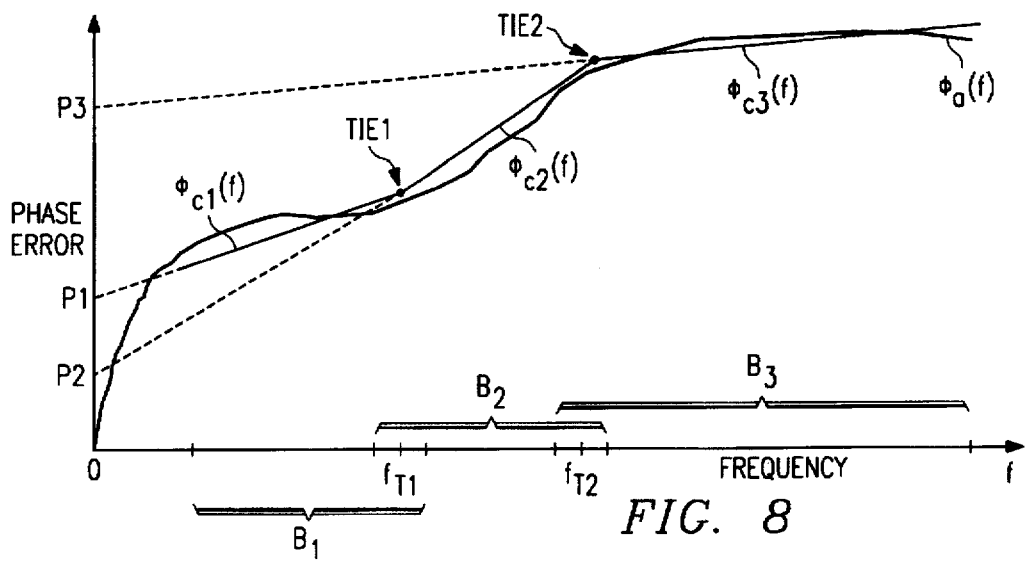
FIG. 8 is a phase error versus frequency plot illustrating the operation of the method according to the first embodiment of the invention.

After all frequency bands have been processed in process 50, conventional post-static correction seismic data processing may continue in the conventional manner. It is contemplated that this additional processing will include such processes as stacking of the corrected traces. Because of the additional phase correction provided by this embodiment of the invention, it is contemplated that this stacking will be significantly more accurate than available using only conventional static correction processes, as the phase error in the traces is corrected in a way which more closely follows the actual phase error over frequency. FIG. 8 illustrates a plot of three phase functions for three frequency bands $B_1$, $B_2$, $B_3$, respectively, according to this embodiment of the invention, relative to actual phase error behavior plot $\Phi_a(f)$. As shown in FIG. 8, the phase functions $\Phi_{c1}(f)$, $\Phi_{c2}(f)$, $\Phi_{c3}(f)$ are significantly more accurate in following the actual phase error behavior plot $\Phi_a(f)$ than are conventional techniques, since the phase constants (i.e., intercepts) P1, P2, P3 of phase functions $\Phi_{c1}(f)$, $\Phi_{c2}(f)$, $\Phi_{c3}(f)$ are not required to coincide with the origin of the phase-error versus frequency plot as in prior techniques (see, e.g., FIG. 2b). The coincidence of the values $\Phi_{c1}(f_{T1})$, $\Phi_{c2}(f_{T2})$ of the phase functions at tie frequency $f_{T1}$ (shown as point TIE1), and the coincidence of the values $\Phi_{c2}(f_{T2})$, $\Phi_{c3}(f_{T2})$ of the phase functions at tie frequency $f_{T2}$ (shown as point TIE2), illustrate the coherence of the phase corrections provided by this embodiment of the invention.

As a result of this embodiment of the invention, therefore, a method and system are provided in which phase error is more accurately taken into account in performing static corrections is provided. The phase static corrections are also determined according to this embodiment of the invention, through the use of iteratively weighed least-squares optimization, in a manner such that cycle skipping and phase wrapping errors in the measurements used for surface-consistent decomposition are substantially discounted, thus ensuring that the decomposition solutions for the time lag and phase components more closely reflect the actual behavior of the near-surface anomalies.

A second and preferred embodiment of the present invention will now be described, in which phase-static corrections are generated according to the same concept as described hereinabove, but in which the efficiency of the operation of computer system 30 in performing the method, and the accuracy of the corrections are both improved. As is evident from the foregoing description, a copy of corrected prestack traces must be retained in memory for each of the various frequency bands, for retrieval and summation in process 50. It has been observed that the memory requirements for storing prestack trace data are substantial. In addition, the summing of the filtered corrected traces in process 50 also involves a large amount of computation. As such, the embodiment of the invention described hereinabove requires substantial computer resources in its execution.

According to this second embodiment of the invention, however, the data storage requirements are greatly reduced, so that the method according to the preset invention may be performed on conventional computers having typical data storage capacities. This second embodiment of the invention is intended to result in the retention of only a single set of traces, namely the original prestack traces. After each iteration through each frequency band's processing according to this second embodiment of the invention, only the phase and statics component solution for the band and a stacked version of the traces for each gather need be stored. This greatly reduces the computer system requirements necessary for executing the present invention.

Figure 9:
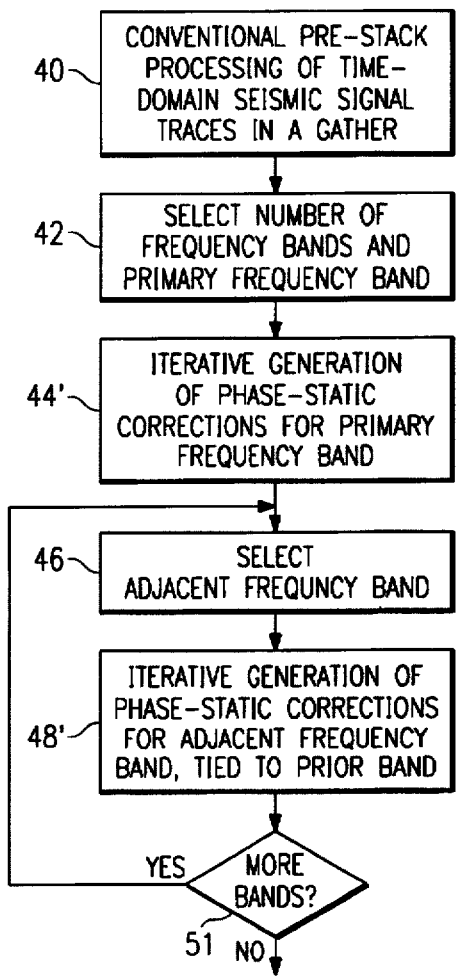
FIG. 9 is a flow chart illustrating the method according to a second embodiment of the present invention.

In order to accomplish these reduced storage requirements, each decomposition and correction generated in each pass for each frequency band must determine the total correction, rather than the residual correction for that pass in that band. The method according to this embodiment of the invention follows the processes of FIG. 4; however, as will now be described relative to FIGS. 9 through 11, primary band process 44 and secondary band process 48 differ from that previously described, in implementing the data storage and computational efficiencies. As shown in FIG. 9, processes 40 and 42 are performed identically as in the previously described embodiment of the invention, such that the traces are prepared for phase static correction according to the selected frequency bands.

Figure 10:
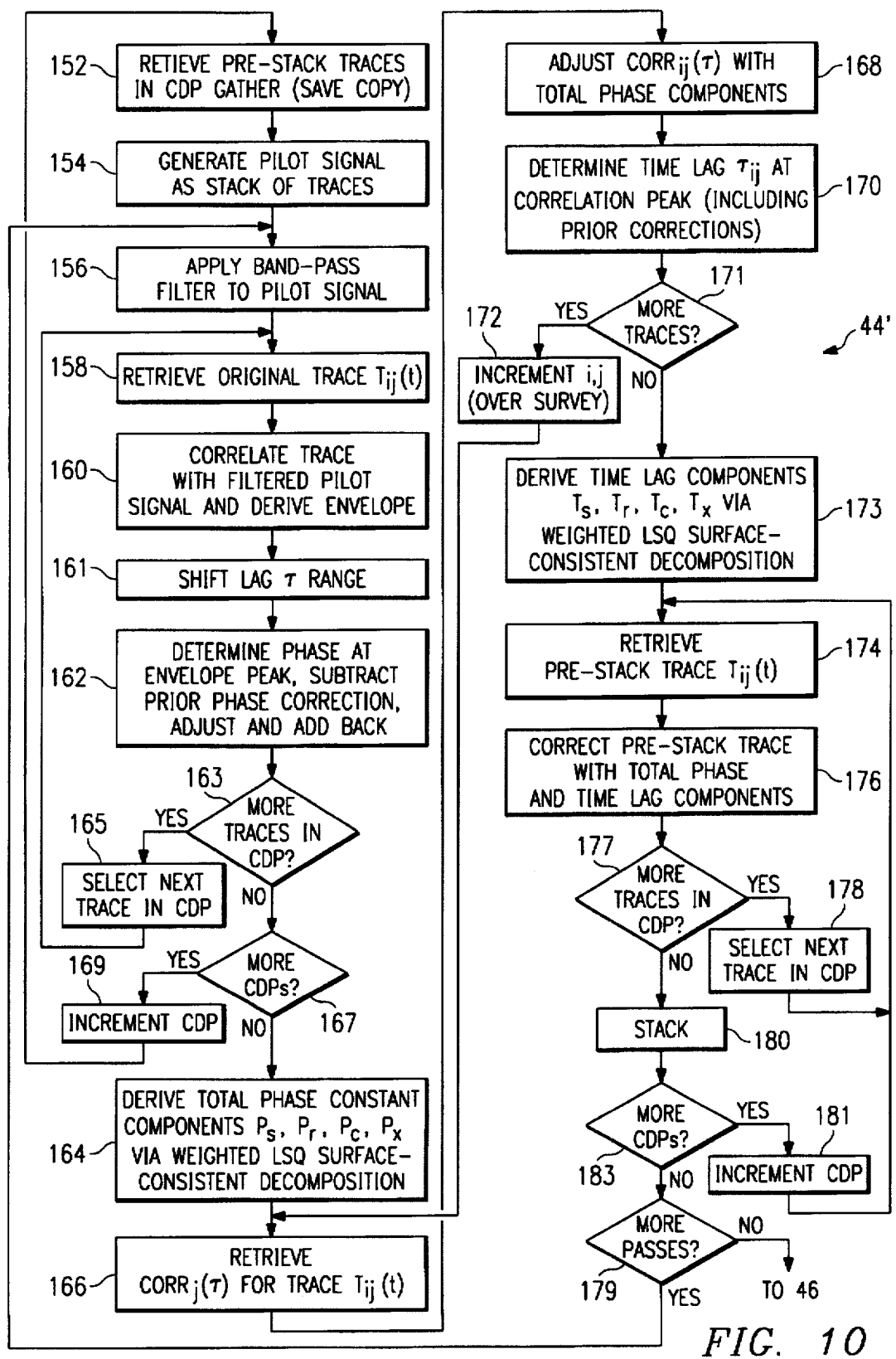
FIG. 10 is a flow chart illustrating primary frequency band analysis in the method according to the second embodiment of the invention.

FIG. 10 illustrates primary band correction process 44', which begins, as before, with process 152 in which prestack traces in a common depth point gather are retrieved from memory by system computer 30. In process 154, a pilot signal is generated from the stack of the prestack traces retrieved in process 152, and a band-pass filter is applied in process 156 according to the selected primary frequency band, resulting in filtered pilot signal $S_p(t)$. An original prestack trace $T_{ij}(t)$ is retrieved from memory in process 158, to derive a correlation function $corr_{ij}(\tau)$ corresponding to the cross-correlation between the retrieved prestack trace $T_{ij}(t)$ and the filtered pilot signal $S_p(t)$, followed by generation of the envelope of the correlation function $corr_{ij}(\tau)$, both performed by system computer 30 in process 160. The operation of process 44', in this first pass, is thus equivalent to that described hereinabove for process 44.

According to this embodiment of the invention, certain corrections must be made in order to comprehend that the correlation of process 160, and also the subsequent processing, is always (even when iterated) being made upon an uncorrected prestack trace retrieved in process 158, rather than upon previously corrected traces. As such, considering that process 44' will likely be performed a number of times to improve the accuracy of the phase function for this primary frequency band, process 161 is performed to shift the range of lag times $\tau$ in the envelope of the correlation over which determination of the peak will be made, by an amount corresponding to the static computed for the retrieved prestack trace $T_{ij}(t)$ in the most recent iteration of process 44' (of course, if this is the first iteration, no static correction exists, and thus no shift is effected in process 161).

In process 162, according to this embodiment of the invention, the phase lag $P_{ij}(\tau_p)$ is determined as the principal value of the instantaneous phase at the peak of the envelope function of correlation function $corr_{ij}(\tau)$, including the addition of any phase corrections that have been previously determined. In this first pass through process 44', no prior corrections have yet been made, and as such the principal value of the at the envelope peak will be used. However, for subsequent passes through process 162, accounting must be made because of the correlation function $corr_{ij}(\tau)$ corresponding to the correlation of uncorrected prestack traces. As such, the total phase lag $P_{ij}(\tau_p)$ is determined, in process 162, by subtracting the previously determined phase correction from the most recent iteration of process 44' from the peak phase lag of the shifted time delay window. After this subtraction, the resulting phase is readjusted by a multiple of $2\pi$ to become principal valued, and the previously subtracted correction from the most recent completed pass is added back into the result, resulting in a phase lag value $P_{ij}(\tau_p)$ that is the total phase constant for the trace, based upon the pilot signal filtered for this first frequency band.

By way of decisions 163, 167 and index incrementing steps 165, 169, the determination of the principal value of the instantaneous phase lag is repeated for each trace in the gather, and for each gather in the survey, as before. Similarly as in the previously described embodiment of the present invention, iteratively weighted least-squares surface-consistent decomposition is next performed, in process 164, to solve for the components of the phase constant in the primary frequency band. However, according to this embodiment of the invention, the phase solution will always be the total phase correction required on this band by the original prestack data, regardless of whether or not process 44' is being iterated.

Following the determination of the phase constant components in process 164, system computer 30 performs process 166 to again retrieve the correlation function $corr_{ij}(\tau)$ for a first uncorrected trace $T_{ij}(t)$ of the survey. To further reduce storage requirements, it may be more efficient to simply regenerate the correlation function $corr_{ij}(\tau)$ at this point, rather than to store and retrieve it. In process 168, according to this embodiment of the invention, the correlation function $corr_{ij}(\tau)$ has its phase adjusted according only to the total phase components $P_{si}$, $P_{rj}$, $P_c$, $P_x$ determined in the most recent pass through process 164 (i.e., the total phase components are those determined in the most recent pass of process 164 for trace $T_{ij}(t)$).

In process 170, the time lag value $\tau_p$ is determined to be the total time lag at the peak of the correlation function $corr_{ij}(\tau)$. The range of lags over which the peak is determined is shifted by the amount of the statics correction made in earlier passes (as described hereinabove relative to process 161). For later passes, this time lag value $\tau_p$ is the total time lag, and not merely a residual value. Decision 171 and trace selection process 172 control the performance of processes 164, 166, 168, 170 so that the time lags at the correlation function peaks are determined for each of the traces in the entire survey. Once all time lags $\tau$ are determined for the traces $T_{ij}(t)$ in the survey, process 173 is performed to derive the total time shift components $T_{si}$, $T_{rj}$, $T_c$ and $T_x$, preferably using the iteratively weighted least-squares method as described hereinabove.

According to this embodiment of the invention, once the statics and phase constants are derived for all of the traces $T_{ij}(t)$ in the survey, correction of the original prestack traces is then performed. As described hereinabove, the phase constant corresponds to the intercept of the phase function, while the statics solution provides the phase slope of the phase function. In process 174, an original prestack trace $T_{ij}(t)$ is retrieved from memory; whether performed in the first pass through process 44' or in subsequent passes, in each case process 174 retrieves the original prestack trace $T_{ij}(t)$ from memory and applies the corrections corresponding to phase constant and statics time lag components in process 176. However, according to this embodiment of the invention, the phase lag components $P_{si}$, $P_{rj}$, $P_c$, $P_x$ applied in process 176 are the total phase lag components required of the original prestack traces (in contrast to only the residual components as applied in process 168). The total time lag components $T_{si}$, $T_{rj}$, $T_c$ and $T_x$ derived in process 173 are also applied to trace $T_{ij}(t)$ in process 176, as before. System computer 30 also stores the phase constant components $P_{si}$, $P_{rj}$, $P_c$, $P_x$ and statics components $T_{si}$, $T_{rj}$, $T_c$ and $T_x$ in memory, for use in subsequent iterations of process 44' (if any).

By the operation of decision 177 and index incrementing process 178, the corrections of process 176 are made to each trace in the gather. When decision 177 returns a NO, indicating that a CDP gather has been corrected, system computer 30 performs a stack of the corrected traces in process 180; this stack is used in subsequent iterations of process 44'. Decision 183 determines whether traces in other gathers remain to be corrected and stacked, and if so process 181 increments the CDP index, and the retrieval and correction of processes 174, 176, 180 is repeated. Upon completion of the correction and stacking for the entire survey (decision 183 returns NO), decision 179 then determines whether additional passes through process 44' are desired. If so, control passes back to process 154, from which the process is repeated.

As noted above, for later passes through process 44', the pilot signal filtered in process 156 and used in correlation 160 is based upon the stack of the traces produced by process 180, rather than as produced by process 154. Secondly, as noted above, the determination of the phase lag $P_{ij}(\tau_p)$ as the principal value of the instantaneous phase of the correlation function is made, in process 161, 162, by shifting the time delays over which the envelope function is interrogated, and is adjusted by subtracting the previous phase lag corrections for the particular trace, setting the phase to the principal value, and adding back in the previous corrections. Finally, as noted above, process 174 always retrieves the original prestack traces for correction, and not the corrected traces, as process 44' derives, in each pass, the total statics correction and total phase constant in the primary band. By using the previous corrections in the pilot signal generated in each pass of process 154, the method according to this embodiment of the invention yields, in each pass of process 44', a new and improved estimate for the total distortion from the primary frequency band. This approach actually improves the accuracy of the correction when the processing is iterated, because errors in the distortion estimate will not accumulate over multiple passes.

Figure 11:
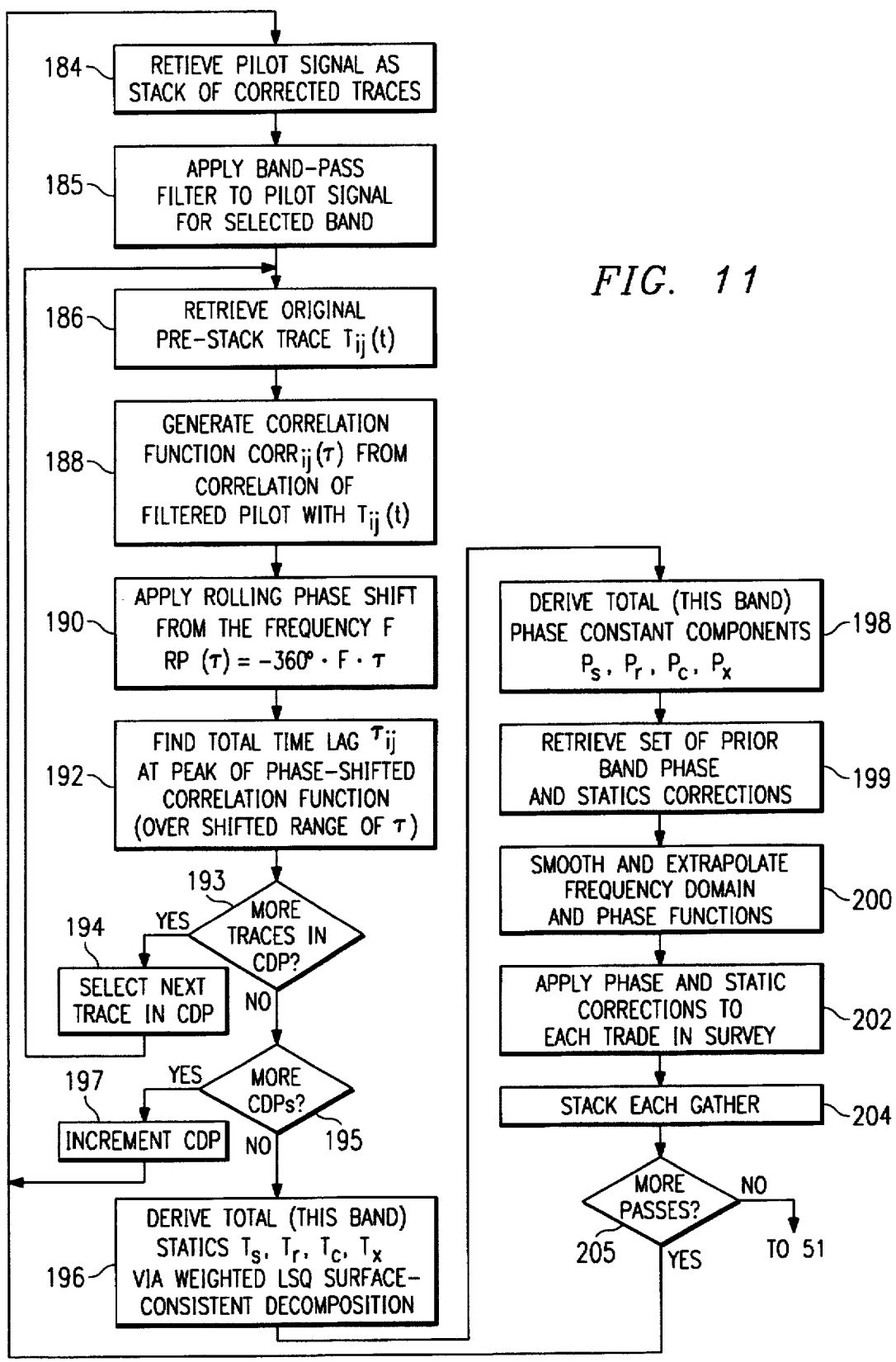
FIG. 11 is a flow chart illustrating secondary frequency band analysis in the method according to the second embodiment of the invention.

Following completion of the desired number of iterations of process 44', the method of FIG. 9 then selects the next adjacent frequency band, in process 46. Attention is now directed to FIG. 11, in which process 48' according to this second and preferred embodiment of the invention will now be described.

As shown in FIG. 11, secondary band process 48' begins with process 184, which retrieves the pilot signal for a particular CDP gather, which is merely the stack of the corrected traces from the prior band (or prior pass through process 48', as the case may be). Process 185 then applies a band-pass filter to this pilot signal for the band selected in process 46.

Individual traces $T_{ij}(t)$ are next processed beginning with process 186 in which an original prestack trace $T_{ij}(t)$ is retrieved from memory. This original prestack trace $T_{ij}(t)$ is correlated with the filtered pilot signal in process 188, so that a correlation function $corr_{ij}(\tau)$ is produced, as before.

A rolling phase shift function $RP(\tau)$ is then applied to the correlation function $corr_{ij}(\tau)$ of the corrected pilot with the uncorrected prestack trace $T_{ij}$, using the tie frequency $f_T$ as before. This rolling phase shift function $RP(\tau)$ is defined as follows:

$$RP(\tau) = P_p - 360° \cdot f_T(\tau - T_p)$$

where $P_p$ is the phase constant computed for trace $T_{ij}$ on the most recent iteration of process 48' for this band (or the last iteration for the previous adjacent band, if this is the first pass for the present frequency band), and where $T_p$ is the statics correction $T_{si} + T_{rj} + T_x(i-j)^2$ computed for trace $T_{ij}$ on the most recent iteration of process 48' for this band (or the last iteration for the previous adjacent band, if this is the first pass for the present frequency band). The rolling phase shift for this second embodiment of the invention is modified, from that used in the first embodiment of the invention described hereinabove, to account for the use of uncorrected data in the correlation.

Process 192 then determines the total time lag $\tau_{ij}$ for trace $T_{ij}(t)$, found at the peak of the correlation function after the application of the rolling phase shift, and over a range of the correlation function $corr_{ij}(\tau)$ that has been shifted by the amount $T_p$ of the static correction for the same trace from the most recent iteration (or from the last iteration of the previous adjacent band, if this is the first iteration on the current band). This time lag is the total time shift required to align the original prestack data with the pilot, given that a compensating phase constant must also be applied so that the phase function is shifted by the same amount at the tie frequency that was determined for the previously processed adjacent band. Decision 193 and CDP incrementing process 194 then continue the determination of the total time lag values for all of the traces in the gather, and decision 195 and CDP incrementing step 197 continue this determination for all of the gathers in the survey.

Process 196 then uses iteratively weighted least-squares surface-consistent decomposition to derive the total statics components for the present frequency band, by decomposing the total time lag values found for each of the traces in the repetitively performed process 192. Following the solution of process 196, total (for this frequency band) phase constant components $P_{si}$, $P_{rj}$, $P_c$, $P_x$ are separately calculated from the residual time lag components, according to the following:

$$P_i = P_{ip} - [360° \cdot f_T(T_i - T_{ip})]$$

where the i index refers to the particular one of the four decomposition components for the current band, where the subscript ip indicates the value for that component from the most recent iteration (either in the same band, or the last iteration in the previous band), and where $f_T$ is the tie frequency. Processes 196, 198 thus determine total values for the time lag and phase constant corrections arising from the frequency band selected in process 46.

According to this embodiment of the invention, however, the corrected traces from each frequency band's processing are not separately stored, but only the $T_i$ and $P_i$ corrections are retained. As such, process 199 is next performed to retrieve the total time lag and phase static corrections, as calculated from all previously processed frequency bands.

Figure 12:
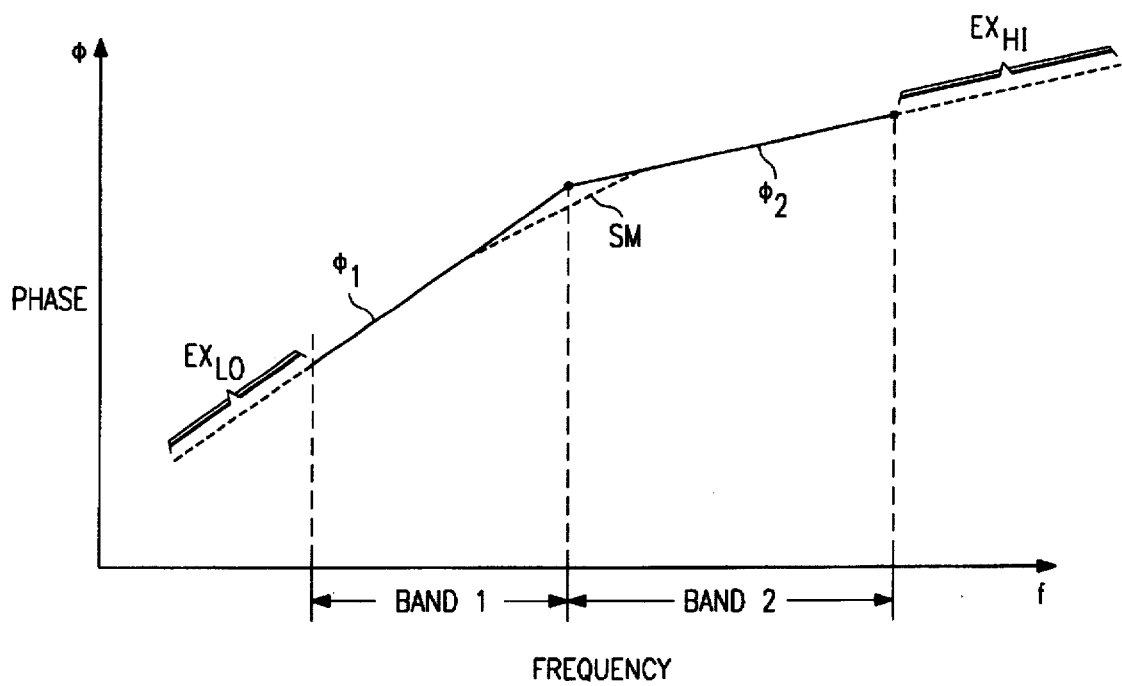
FIG. 12 is a plot illustrating the effects of smoothing and extrapolation provided according to the second embodiment of the invention.

Process 200 is then performed to smooth and extrapolate these corrections in the frequency domain. Referring to FIG. 12, an example of the application of process 200 is illustrated, relative to two phase functions $\Phi_1$ and $\Phi_2$ derived for frequency bands 1 and 2 of the Figure, and which are set to equal one another at a tie frequency fT therebetween. As illustrated in FIG. 12, a spline function is used to derive a smoothing curve SM near tie frequency $f_T$, providing a smoother phase correction behavior. In addition, extrapolated phase functions $EX_{HI}$ and $EX_{LO}$ are generated in process 200, linearly extending the phase functions from outside of the frequency bands 1 and 2 previously analyzed. The extrapolation of the phase functions allow for the correction process according to this embodiment of the invention to stop at this point, if the corrections are adequate for the seismic survey. This extrapolation also prepares the data for forming the initial pilots for the next band to be processed.

Total time lag and phase corrections are then applied to the original prestack traces $T_{ij}(t)$ in process 202, thus incorporating in one pass over the data (in the frequency domain) the corrections from all previous processing; the traces for each CDP gather are then stacked in process 204, if desired, for use as pilot signals in additional iterations of process 48' for the present band (as determined by decision 205), or for the first iteration of process 48' for the next band (as determined by decision 51 of FIG. 9).

At such time as no additional passes through process 48' are to be done (decision 205 returns a NO), control passes back to decision 51 of FIG. 9 to determine if additional frequency bands are to be processed. If so, processes 46, 48' are repeated for the next adjacent frequency band, using (in generation of the pilot signal in process 184), the most recent corrected stacked traces from process 204 in the last iteration of process 48' for the previous band.

Upon completion of all frequency bands, decision 51 returns a NO result. The most recent set of corrected traces (either prior to or after stack process 204) may be retained in memory at this time. According to this embodiment of the invention, therefore, only the original prestack traces, stacks of the most recently corrected traces, and the most recent set of time lag and phase corrections, need be stored at any one time. As such, the computing efficiency provided by this embodiment of the invention is much improved, without sacrificing any of the accuracy or benefits provided in the first embodiment of the invention described hereinabove. In fact, as indicated above, this second embodiment can actually result in improved corrections both because errors are prevented from accumulating by the use of the original (rather than corrected) prestack traces in the correlation operation, and because of the application of spline smoothing to the phase corrections.

Various alternative implementations of the present invention are also contemplated, each of such alternatives receiving the benefit of the improved phase corrections over frequency. For example, the primary frequency band may be the lowest frequency portion of the seismic survey (i.e., the low limit of the primary frequency band may be 0 Hz). In this case, ordinary statics correction techniques may be used in place of the first band procedure for the primary band because, for low frequencies, the required phase constant corrections are often small (being zero at zero frequency), and thus may be ignored.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to correct seismic survey data for the effects of near-surface earth layers, the seismic survey data including multiple traces, each trace corresponding to acoustic energy imparted by a source, reflected from geological structures beneath the surface of the earth, and detected at a surface location, the method comprising the steps of:

selecting a primary frequency band and a plurality of secondary frequency bands corresponding to the frequency spectrum of a plurality of traces, wherein at least one of the secondary frequency bands is adjacent in frequency to the primary frequency band;

generating a primary phase correction function for the plurality of traces to correct for phase distortion in the primary frequency band;

generating a secondary phase correction function for each of the plurality of traces to correct for phase distortion, wherein the secondary phase correction function for the secondary frequency band adjacent to the primary band has a value at a tie frequency common to the adjacent secondary band and the primary frequency band, that is equal to the value of the primary phase correction function at the tie frequency; and correcting each of the plurality of traces by applying the primary phase correction function and the secondary phase correction function thereto.

2. The method of claim 1, wherein the step of generating a primary phase correction function comprises:

generating a first pilot signal corresponding to the plurality of traces in each of a plurality of gathers;

filtering the first pilot signal with a band-pass filter having a pass-band corresponding to the primary frequency band;

correlating each of the plurality of traces with the filtered first pilot signal to produce a correlation function for each trace;

determining an instantaneous phase constant value for each of the plurality of traces at a peak of an envelope of the correlation function for the trace;

decomposing the instantaneous phase constant values for the plurality of traces according to a surface-consistent decomposition;

wherein the step of correcting the plurality of traces for the primary phase correction function applies the results of the decomposing step.

3. The method of claim 2, further comprising:

generating a primary time lag static correction for the plurality of traces to correct for time lag distortion in the primary frequency band;

generating secondary time lag static corrections for the plurality of traces to correct for time lag distortion in each of the secondary frequency bands; and correcting each of the plurality of traces by applying the primary time lag static correction and the secondary time lag static corrections.

4. The method of claim 3, wherein the step of generating a primary time lag static correction comprises:

applying the instantaneous phase constant values to the correlation function for each trace;

then determining the time lag value for each trace at the peak of the correlation function for the trace; and decomposing the time lag values for each of the plurality of traces according to a surface-consistent decomposition;

wherein the step of correcting the plurality of traces for the primary time lag correction applies the result of the step of decomposing the time lag values.

5. The method of claim 4, wherein each of the decomposing steps perform an iteratively weighted least-squares surface-consistent decomposition.

6. The method of claim 2, further comprising:

generating a primary time lag static correction for the plurality of traces to correct for time lag distortion in the primary frequency band;

generating secondary time lag static corrections for the plurality of traces to correct for time lag distortion in each of the secondary frequency bands; and correcting each of the plurality of traces by applying the primary time lag static correction and the secondary time lag static corrections;

wherein the step of generating a secondary phase correction function comprises:

generating a second pilot signal after the correcting step;

applying a band-pass filter to the second pilot signal, the filter having a pass-band corresponding to the secondary frequency band;

generating a correlation function for each trace, corresponding to the correlation of the filtered second pilot signal with the trace;

applying, to each of the correlation functions, a rolling phase shift that varies proportionately with the product of the time lag and the tie frequency;

determining the time lag at the peak of the shifted correlation function for each of the traces;

decomposing the time lags for the plurality of traces according to a surface-consistent decomposition; and calculating the secondary phase correction function from the results of the step of decomposing the time lags.

7. The method of claim 6, wherein the step of generating a correlation function for each trace generates a correlation function corresponding to the correlation of the filtered second pilot signal with a copy of each trace prior to the correcting step.

8. The method of claim 7, wherein the steps of generating secondary phase and time lag corrections generates total secondary phase constant and time lag static corrections for the secondary frequency band;

and wherein the step of correcting each of the plurality of traces applies a composite of the total primary phase constant and time lag static corrections and the total secondary phase constant and time lag static corrections to each of the plurality of traces.

9. The method of claim 8, further comprising:

combining the primary phase correction function and the total secondary phase corrections in the frequency domain; and smoothing the result of the combining step at frequencies near the tie frequency.

10. A computer system for correcting seismic data for the effects of near-surface earth layers, the seismic data including multiple traces, each trace corresponding to the time-domain detection, at a surface location, of acoustic energy imparted by a source and reflected from geological structures beneath the surface of the earth, comprising:

a memory for storing the traces in digital form; and a system computer, programmed in such a manner as to perform the steps of:

selecting a primary frequency band and a plurality of secondary frequency bands corresponding to the frequency spectrum of a plurality of traces, wherein at least one of the secondary frequency bands is adjacent in frequency to the primary frequency band;

generating a primary phase correction function for the plurality of traces to correct for phase distortion in the primary frequency band;

generating a secondary phase correction function for each of the plurality of traces to correct for phase distortion, wherein the secondary phase correction function for the secondary frequency band adjacent to the primary band has a value at a tie frequency common to the adjacent secondary band and the primary frequency band, that is equal to the value of the primary phase correction function at the tie frequency; and correcting each of the plurality of traces by applying the primary phase correction function and the secondary phase correction function thereto; and storing the results of the correcting step in the memory.

11. The computer system of claim 10, wherein the memory is a disk storage device.

12. The system of claim 10, wherein the system computer is programmed to perform the step of generating a primary phase correction function by:

generating a first pilot signal corresponding to the plurality of traces in each of a plurality of gathers;

filtering the first pilot signal with a band-pass filter having a pass-band corresponding to the primary frequency band;

correlating each of the plurality of traces with the filtered first pilot signal to produce a correlation function for each trace;

determining an instantaneous phase constant value for each of the plurality of traces at a peak of an envelope of the correlation function for the trace;

decomposing the instantaneous phase constant values for the plurality of traces according to a surface-consistent decomposition;

wherein the step of correcting the plurality of traces for the primary phase correction function applies the results of the decomposing step.

13. The system of claim 12, wherein the computer is also programmed to perform the steps of:

generating a primary time lag static correction for the plurality of traces to correct for time lag distortion in the primary frequency band;

generating secondary time lag static corrections for the plurality of traces to correct for time lag distortion in each of the secondary frequency bands; and correcting each of the plurality of traces by applying the primary time lag static correction and the secondary time lag static corrections.

14. The system of claim 13, wherein the system computer is programmed to perform the step of generating a primary time lag static correction by:

applying the instantaneous phase constant values to the correlation function for each trace;

then determining the time lag value for each trace at the peak of the correlation function for the trace; and decomposing the time lag values for each of the plurality of traces according to a surface-consistent decomposition;

wherein the system computer is programmed to perform the step of correcting the plurality of traces for the primary time lag correction by applying the result of the step of decomposing the time lag values.

15. The system of claim 14, wherein the system computer is programmed to perform each of the decomposing steps by an iteratively weighted least-squares surface-consistent decomposition.

16. The system of claim 12, wherein the system computer is further programmed to perform the steps of:

generating a primary time lag static correction for the plurality of traces to correct for time lag distortion in the primary frequency band;

generating secondary time lag static corrections for the plurality of traces to correct for time lag distortion in each of the secondary frequency bands; and correcting each of the plurality of traces by applying the primary time lag static correction and the secondary time lag static corrections;

wherein the step of generating a secondary phase correction function comprises:

generating a second pilot signal after the correcting step;

applying a band-pass filter to the second pilot signal, the filter having a pass-band corresponding to the secondary frequency band;

generating a correlation function for each trace, corresponding to the correlation of the filtered second pilot signal with the trace;

applying, to each of the correlation functions, a rolling phase shift that varies proportionately with the product of the time lag and the tie frequency;

determining the time lag at the peak of the shifted correlation function for each of the traces;

decomposing the time lags for the plurality of traces according to a surface-consistent decomposition; and calculating the secondary phase correction function from the results of the step of decomposing the time lags.

17. The system of claim 16, wherein the computer is programmed to perform the step of generating a correlation function for each trace corresponding to the correlation of the filtered second pilot signal with a copy of each trace prior to the correcting step.

18. The system of claim 17, wherein the system computer is programmed to perform the steps of generating secondary phase and time lag corrections by generating a total secondary phase constant and time lag static corrections for the secondary frequency band;

and wherein the system computer is programmed to perform the step of correcting each of the plurality of traces by applying a composite of the total primary phase constant and time lag static corrections and the total secondary phase constant and time lag static corrections to each of the plurality of traces.

19. A computer-readable memory configured so that, when read and used by a computer, the computer is directed to correct seismic data for the effects of near-surface earth layers, the seismic data including multiple traces, each trace corresponding to the time-domain detection, at a surface location, of acoustic energy imparted by a source and reflected from geological structures beneath the surface of the earth, said computer directed by a plurality of operations comprising:

selecting a primary frequency band and a plurality of secondary frequency bands corresponding to the frequency spectrum of a plurality of traces, wherein at least one of the secondary frequency bands is adjacent in frequency to the primary frequency band;

generating a primary phase correction function for the plurality of traces to correct for phase distortion in the primary frequency band;

generating a secondary phase correction function for each of the plurality of traces to correct for phase distortion, wherein the secondary phase correction function for the secondary frequency band adjacent to the primary band has a value at a tie frequency common to the adjacent secondary band and the primary frequency band, that is equal to the value of the primary phase correction function at the tie frequency; and correcting each of the plurality of traces by applying the primary phase correction function and the secondary phase correction function thereto.

20. The computer-readable medium of claim 19, wherein the plurality of operations further comprises:

generating a primary time lag static correction for the plurality of traces to correct for time lag distortion in the primary frequency band;

generating secondary time lag static corrections for the plurality of traces to correct for time lag distortion in each of the secondary frequency bands; and correcting each of the plurality of traces by applying the primary time lag static correction and the secondary time lag static corrections.

21. The computer-readable medium of claim 20, wherein the step of generating a primary phase correction function comprises:

generating a first pilot signal corresponding to the plurality of traces in each of a plurality of gathers;

filtering the first pilot signal with a band-pass filter having a pass-band corresponding to the primary frequency band;

correlating each of the plurality of traces with the filtered first pilot signal to produce a correlation function for each trace;

determining an instantaneous phase constant value for each of the plurality of traces at a peak of an envelope of the correlation function for the trace;

decomposing the instantaneous phase constant values for the plurality of traces according to a surface-consistent decomposition;

wherein the step of correcting the plurality of traces for the primary phase correction function applies the results of the decomposing step.

22. The computer-readable medium of claim 21, wherein the plurality of operations further comprises the step of generating a primary time lag static correction for the plurality of traces to correct for time lag distortion in the primary frequency band by performing the operations of:

applying the results of the decomposing step to the correlation function for each trace;

then determining the time lag value for each trace at the peak of the correlation function for the trace; and decomposing the time lag values for each of the plurality of traces according to a surface-consistent decomposition;

wherein the step of correcting the plurality of traces for the primary time lag correction applies the result of the step of decomposing the time lag values.

23. The computer-readable medium of claim 22, wherein the plurality of operations further comprises:

generating a primary time lag static correction for the plurality of traces to correct for time lag distortion in the primary frequency band;

generating secondary time lag static corrections for the plurality of traces to correct for time lag distortion in each of the secondary frequency bands; and correcting each of the plurality of traces by applying the primary time lag static correction and the secondary time lag static corrections;

wherein the step of generating a secondary phase static correction function comprises:

generating a second pilot signal after the correcting step;

applying a band-pass filter to the second pilot signal, the filter having a pass-band corresponding to the secondary frequency band;

generating a correlation function for each trace, corresponding to the correlation of the filtered second pilot signal with the trace;

applying, to each of the correlation functions, a rolling phase shift that varies proportionately with the product of the time lag and the tie frequency;

determining the time lag at the peak of the shifted correlation function for each of the traces;

decomposing the time lags for the plurality of traces according to a surface-consistent decomposition; and calculating the secondary phase correction function from the results of the step of decomposing the time lags.

24. The computer-readable medium of claim 23, wherein the step of generating a correlation function for each trace generates a correlation function of the filtered second pilot signal with a copy of each trace prior to the correcting step;

wherein the steps of generating a secondary phase correction function and time lag corrections generates a total secondary phase constant and time lag static corrections for the secondary frequency band;

and wherein the step of correcting each of the plurality of traces applies a composite of the total primary phase constant and time lag static corrections and the total secondary phase constant and time lag static corrections to each of the plurality of traces.

25. The computer-readable medium of claim 23, wherein the decomposing steps perform an iteratively weighted least-squares surface-consistent decomposition.

26. A method of operating a computer to correct seismic survey data for the effects of near-surface earth layers, the seismic survey data including multiple traces, each trace corresponding to acoustic energy imparted by a source, reflected from geological structures beneath the surface of the earth, and detected at a surface location, the method comprising the steps of:

generating a first pilot signal corresponding to the plurality of traces in each of a plurality of gathers;

in each gather, correlating each of the plurality of traces with the filtered first pilot signal to produce a correlation function for each trace;

determining the time lag for each of the plurality of traces at a peak of an envelope of the correlation function for the trace;

decomposing the time lag values for the plurality of traces according to a surface-consistent decomposition in which a weighted sum of residuals, one residual and one weighting factor for each trace, is minimized;

after the decomposing step, repeatedly calculating the weighting factors for each of the plurality of traces based upon its residual from the most recent decomposing step and then repeating the decomposing step; and correcting the plurality of traces by applying to each trace the results of the repeated decomposing steps.

27. A method of operating a computer to correct seismic survey data for the effects of near-surface earth layers, the seismic survey data including multiple traces, each trace corresponding to acoustic energy imparted by a source, reflected from geological structures beneath the surface of the earth, and detected at a surface location, the method comprising the steps of:

generating a pilot signal corresponding to the plurality of traces in each of a plurality of gathers;

in each gather, correlating each of the plurality of traces with the pilot signal to produce a correlation function for each trace;

determining an envelope function of the correlation function for each of the plurality of traces;

determining an instantaneous phase at the peak of the envelope function for each of the plurality of traces;

decomposing the instantaneous phases into phase constant components according to a surface-consistent decomposition;

then adjusting the correlation function for each of the plurality of traces by a phase shift based on the phase constant components for the trace;

selecting the time lag at the peak of the adjusted correlation function for each of the plurality of traces;

decomposing the time lags for the plurality of traces into components according to a surface-consistent decomposition; and correcting each of the traces using the results of the decomposing steps.

28. The method of claim 27, wherein the steps of generating a pilot signal, correlating each of the plurality of traces with the pilot signal, and determining an envelope function are performed for each of a plurality of gathers;

and wherein the decomposing steps are performed simultaneously for each of the traces in each of the plurality of gathers.

* * * * *